United States Patent
Hashida

(10) Patent No.: US 10,949,043 B2
(45) Date of Patent: Mar. 16, 2021

(54) INPUT DEVICE MANUFACTURING METHOD AND INPUT DEVICE

(71) Applicant: Alps Alpine Co., Ltd., Tokyo (JP)

(72) Inventor: Junji Hashida, Miyagi-ken (JP)

(73) Assignee: Alps Alpine Co., Ltd, Tokyo (JP)

( * ) Notice: Subject to any disclaimer, the term of this patent is extended or adjusted under 35 U.S.C. 154(b) by 0 days.

(21) Appl. No.: 16/684,034

(22) Filed: Nov. 14, 2019

(65) Prior Publication Data

US 2020/0081578 A1    Mar. 12, 2020

Related U.S. Application Data

(63) Continuation of application No. PCT/JP2018/023487, filed on Jun. 20, 2018.

(30) Foreign Application Priority Data

Aug. 8, 2017   (JP) .............................. JP2017-153041

(51) Int. Cl.
*G06F 3/044*   (2006.01)
*B32B 37/12*   (2006.01)
(Continued)

(52) U.S. Cl.
CPC .............. *G06F 3/0445* (2019.05); *B32B 7/12* (2013.01); *B32B 27/08* (2013.01); *B32B 27/308* (2013.01); *B32B 27/325* (2013.01); *B32B 27/365* (2013.01); *B32B 37/1207* (2013.01); *B32B 2333/12* (2013.01); *B32B 2367/00* (2013.01);
(Continued)

(58) Field of Classification Search
CPC combination set(s) only.
See application file for complete search history.

(56) References Cited

U.S. PATENT DOCUMENTS

2007/0291963 A1    12/2007  Watanabe et al.
2012/0242610 A1*    9/2012  Yasumatsu ............ H01L 27/323
                                                               345/173
(Continued)

FOREIGN PATENT DOCUMENTS

JP    2016-45841    4/1916
JP    2016-207200   12/1916
(Continued)

OTHER PUBLICATIONS

International Search Report from International Application No. PCT/JP2018/023487 dated Sep. 25, 2018.

*Primary Examiner* — Deeprose Subedi
(74) *Attorney, Agent, or Firm* — Beyer Law Group LLP

(57) ABSTRACT

An input device manufacturing method according to an aspect of the present invention includes a lamination step of preparing a first substrate formed from a flat plate of a translucent synthetic resin, a second substrate formed from a flat plate of a translucent synthetic resin, and a sensor film formed from a translucent resin film on which a translucent electrode is disposed, and holding the sensor film between the first substrate and the second substrate to form a flat multilayer body; and a bending step of bending the flat multilayer body into a curved multilayer body retaining a curved shape. Thus, the input device can secure sufficient adhesion between the substrates and the sensor film, and can retain high detection accuracy with the sensor film.

22 Claims, 27 Drawing Sheets

(51) Int. Cl.
   *B32B 27/08*   (2006.01)
   *B32B 7/12*    (2006.01)
   *B32B 27/30*   (2006.01)
   *B32B 27/32*   (2006.01)
   *B32B 27/36*   (2006.01)

(52) U.S. Cl.
   CPC ..... *B32B 2369/00* (2013.01); *B32B 2457/208* (2013.01); *G06F 2203/04103* (2013.01)

(56)                References Cited

U.S. PATENT DOCUMENTS

2014/0043771 A1     2/2014  Isoda et al.
2016/0306451 A1*   10/2016  Isoda ................... B32B 27/325

FOREIGN PATENT DOCUMENTS

JP       2008-21304      1/2008
JP       2013-246741    12/2013
JP       2014-035805     2/2014
JP       2014-067365     4/2014
JP       2014-157400     8/2014
JP       2015-158722     9/2015

* cited by examiner

INPUT DEVICE MANUFACTURING METHOD AND INPUT DEVICE

CLAIM OF PRIORITY

This application is a Continuation of International Application No. PCT/JP2018/023487 filed on Jun. 20, 2018, which claims benefit of Japanese Patent Application No. 2017-153041 filed on Aug. 8, 2017. The entire contents of each application noted above are hereby incorporated by reference.

BACKGROUND OF THE INVENTION

1. Field of the Invention

The present invention relates to an input-device manufacturing method and an input device, particularly to a curved-input-device manufacturing method and a curved input device.

2. Description of the Related Art

Besides flat input devices, curve-shaped input devices have been developed these years to be applicable to portable devices or in-car devices. Japanese Unexamined Patent Application Publication No. 2016-045841 discloses a curved input device including a substrate and a sensor film bonded together with an optical clear adhesive layer (OCA layer) interposed therebetween. This input device can retain high optical characteristics at the curved portion.

Japanese Unexamined Patent Application Publication No. 2013-246741 describes a 3-dimensional curved-surface touch screen. In this 3-dimensional curved-surface touch screen, a 3-dimensional curved surface is formed by drawing a multilayer body softened with heat. Japanese Unexamined Patent Application Publication Nos. 2014-067365, 2008-021304, and 2014-035805 each disclose an input device including a flexible circuit to which a lead of a touch screen is connected, the flexible circuit being bent to extend in the direction perpendicular to a panel surface.

During manufacturing of a curved input device, attaching a sensor film to a substrate formed into an intended curved shape in advance hinders fully tight adhesion between the substrate and the sensor film in view of an alignment or a gap between the substrate and the sensor film. Use of a transparent resin plate as an easily bendable substrate has a smaller dielectric constant than a glass, and is thus more likely to have low sensor responsivity. To address this, the sensor film is disposed as a layer near the panel surface, and the lead extending from the sensor film is wired to a panel back surface. However, to wire the lead from near the panel surface to the back surface is to wire the lead from a detection area at the panel center to a non-detection area at the panel periphery, which is more likely to cause detection errors or noise intrusion in the non-detection area.

The present invention aims to provide a method for manufacturing an input device having a curved shape and including a substrate and a sensor film fully tightly adhering to each other, the sensor film having high detection accuracy, and to provide the input device.

SUMMARY OF THE INVENTION

The present invention provides an input device manufacturing method that includes a lamination step of preparing a first substrate formed from a flat plate of a translucent synthetic resin, a second substrate formed from a flat plate of a translucent synthetic resin, and a sensor film formed from a translucent resin film on which a translucent electrode is mounted, and holding the sensor film between the first substrate and the second substrate to form a flat multilayer body; and a bending step of bending the flat multilayer body to form a curved multilayer body retaining a curved shape.

In this structure, the sensor film is held between the flat first substrate and the flat second substrate to form a flat multilayer body, which is bent from the flat state. Thus, the sensor film can have a curved shape while being fully tightly adhering to the first substrate and the second substrate.

In the above manufacturing method, the curved multilayer body may include a non-lamination area in which the second substrate is absent when viewed in a lamination direction, and the lamination step may include extending of a lead portion including a lead electrically connected to the electrode of the sensor film through the non-lamination area to a surface of the second substrate opposite to a surface facing the sensor film. In this structure, the lead portion can be extended to the back surface without being wired over a side surface of the input device, and thus can omit wiring possibly causing detection errors.

In the above manufacturing method, the bending step may include bending of the flat multilayer body with heat. Thus, the flat multilayer body can be bent with heat to have a curved shape.

In the above manufacturing method, the bending step may include bending of the flat multilayer body at a first temperature, and then retaining the curved shape at a second temperature. Thus, the flat multilayer body can be bent and retain the curved shape with a temperature change from the first temperature and the second temperature.

In the above manufacturing method, the bending step may include deforming of the first substrate disposed on a top surface of the sensor film into a convex, and deforming of the second substrate disposed on a back surface of the sensor film into a concave. The second substrate may have a thickness smaller than a thickness of the first substrate. A ratio of the thickness of the second substrate to the thickness of the first substrate is preferably smaller than 0.5, or more preferably smaller than or equal to 0.25. Thus, a tensile stress applied to a sensor film disposed inside the curved multilayer body is reduced.

In the above manufacturing method, the lamination step may include laminating of a decorating film on a surface of the first substrate opposite to a surface facing the sensor film to form the flat multilayer body. In this structure, a curved multilayer body including the decorating film can be formed from a flat multilayer body including the decorating film while the decorating film and the first substrate are fully tightly adhering to each other.

In the above manufacturing method, the lamination step may include holding of the decorating film between the first substrate and the sensor film to form the flat multilayer body. In this structure, a curved multilayer body can be formed while the decorating film is enclosed in the flat multilayer body.

The above manufacturing method may further include a bonding step of bonding, after the bending step, a decorating film on a top surface of the curved multilayer body. In this structure, after the curved multilayer body is formed, a decorating film corresponding to an aspect of the input device can be individually bonded to the curved multilayer body.

In the above manufacturing method, the bonding step may include covering of a side end surface of the curved multilayer body with an end portion of the decorating film. In this structure, the side end surface of the curved multilayer body is covered with the decorating film, so that stray light that is to enter the inside through the side end surface of the curved multilayer body can be effectively prevented.

In the above manufacturing method, a decorating portion may be disposed on a portion of a top surface of the first substrate. In this structure, the decorating portion can be disposed on the top surface of a first substrate at a required position.

In the above manufacturing method, the flat multilayer body may include an intermediate member disposed on an outer side of the sensor film between the first substrate and the second substrate. The intermediate member is an optically clear adhesive (OCA) or a thermosetting adhesive. Thus, a gap between the sensor film and the first substrate or the second substrate caused by the thickness of the sensor film is filled with an intermediate member to hold the sensor film between the first substrate and the second substrate, so that the first substrate and the second substrate can adhere to each other more tightly.

An input device according to an aspect of the present invention includes a first substrate formed from a translucent synthetic resin and having a curved shape; a second substrate formed from a translucent synthetic resin and having a curved shape; and a sensor film disposed between the first substrate and the second substrate, and formed from a translucent resin film on which a translucent electrode is disposed. The first substrate, the second substrate, and the sensor film form a curved multilayer body including a curved detection area. In this input device, the curved multilayer body includes a non-lamination area in which the second substrate is absent when viewed in a lamination direction, the sensor film includes a lead electrically connected to the electrode, and the lead extends through the non-lamination area to a surface of the second substrate opposite to a surface facing the sensor film. In this structure, a sensor film is held between the curved first substrate and the curved second substrate with a sufficiently high adhesive force.

A curved multilayer body in which the sensor film is held between the curved first substrate and the curved second substrate with a sufficiently high adhesive force is formed. Furthermore, the lead portion is extended through the non-lamination area to a surface of the second substrate opposite to the surface facing the sensor film. Thus, the lead portion can be extended to the back surface without being wired over a side surface of the input device.

In the above input device, a curved shape of the curved multilayer body may be any one of a semi-circular cylinder, a hemisphere, and a three-dimensional shape.

In the above input device, an intermediate member may be disposed on an outer side of the sensor film between the first substrate and the second substrate. Specific examples of a material of the intermediate member include a cured object made of a thermosetting material. When the intermediate member is made of this material, the intermediate member can retain appropriate rigidity (form retention). This structure can thus effectively reduce distortion in shape due to springback with which the curved multilayer body in the curved shape is to return to the original shape. Preferably, the intermediate member has a function of fixing the first substrate and the second substrate thereto.

In the curved multilayer body of the input device, the first substrate disposed on a top surface of the sensor film may have a convex shape, and the second substrate disposed on a back surface of the sensor film may have a concave shape, and the second substrate may have a thickness smaller than a thickness of the first substrate. Here, a ratio of the thickness of the second substrate to the thickness of the first substrate is preferably smaller than 0.5, or more preferably smaller than or equal to 0.25. In this structure, a tensile stress applied to the sensor film disposed inside the curved multilayer body is reduced.

Advantageous Effects of Invention

The present invention can provide an input device manufacturing method for manufacturing an input device having a curved shape and including a substrate and a sensor film fully tightly adhering to each other, the sensor film having high detection accuracy.

DESCRIPTION OF THE PREFERRED EMBODIMENTS

Embodiments of the present invention will be now be described below with reference to the drawings. In the following description, the same components are denoted with the same reference signs, and description of the components already described will be omitted as appropriate. In this description, "transparency" and "translucency" denote the state where the visible light transmittance is higher than or equal to 50% (preferably, higher than or equal to 80%). Furthermore, a haze value is preferably smaller than or equal to 6%.

(Structure of Input Device)

Figure 1A:
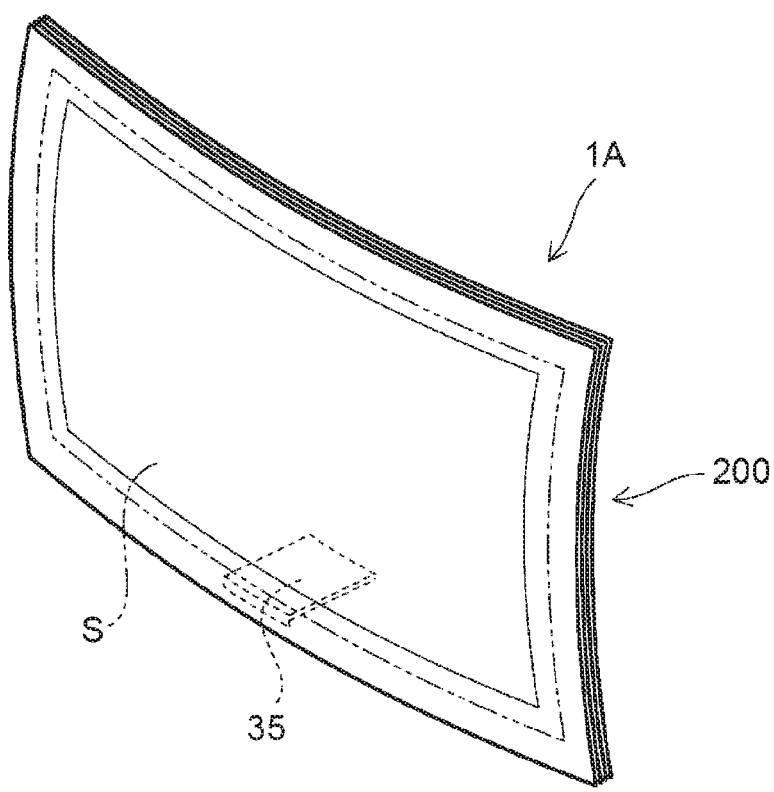
FIGS. 1A and 1B are perspective views of an input device according to the present embodiment.
Figure 1B:
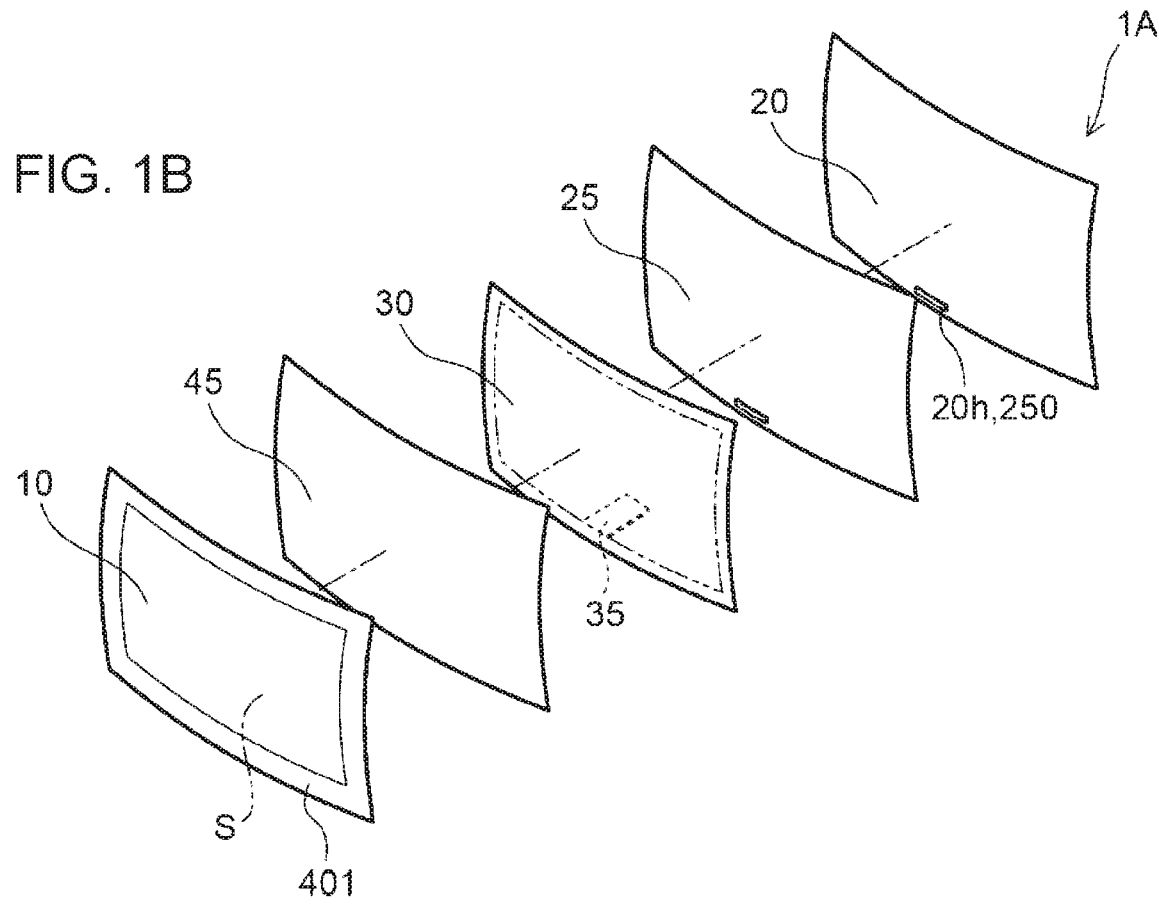
Figure 2:
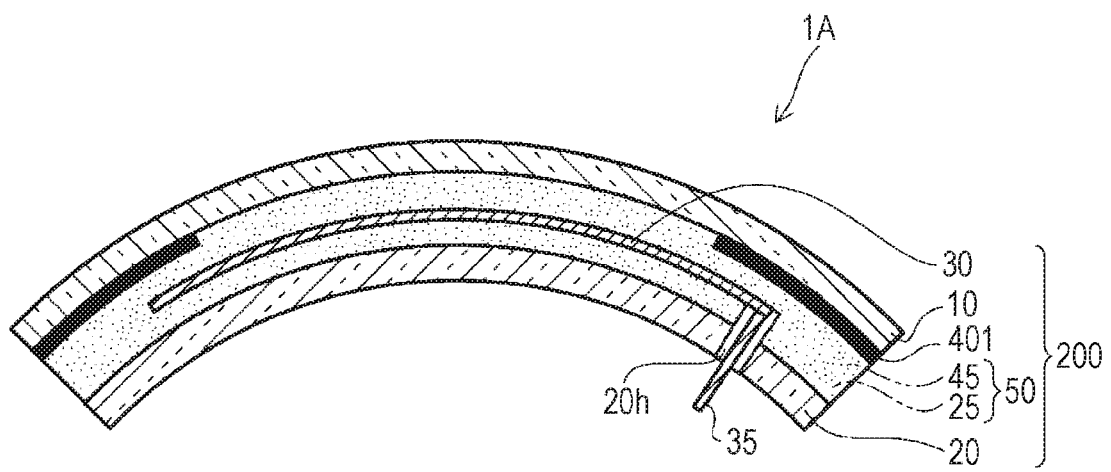
FIG. 2 is a schematic cross-sectional view of an input device according to the present embodiment.

FIGS. 1A and 1B are perspective views of an input device according to the present embodiment. FIG. 1A is an entire view, and FIG. 1B is an exploded view. FIG. 2 is a schematic cross-sectional view of an input device according to the present embodiment.

An example of an input device 1A is a capacitive sensor. A capacitive sensor causes a change in capacitance in response to a finger approaching a position detection area. The capacitive sensor detects a change in potential caused by this change in capacitance, and determines the coordinates of the finger approaching point in the position detection area.

The input device 1A according to the present embodiment includes a curved multilayer body 200. The curved shape of the curved multilayer body 200 may be any shape, such as a semi-circular cylinder, a hemisphere, or another three-dimensional shape. Specific examples of the degree of curvature include a radius of a sphere (SR) greater than or equal to 400 mm and smaller than or equal to 1500 mm, or preferably, SR greater than or equal to 400 mm and smaller than or equal to 800 mm. The input device 1A includes a first substrate 10, a second substrate 20, and a sensor film 30, which are respectively curved.

The sensor film 30 is held between the first substrate 10 and the second substrate 20. The first substrate 10 and the second substrate 20 are made of a translucent synthetic resin material. The first substrate 10 and the second substrate 20 are made of, for example, acrylic resin such as polymethylmethacrylate (PMMA) resin, or polycarbonate (PC) resin. The first substrate 10 and the second substrate 20 have a thickness greater than or equal to approximately 0.3 mm and smaller than or equal to approximately 5 mm, preferably, greater than or equal to approximately 0.5 mm and smaller than or equal to approximately 3 mm, or more preferably, greater than or equal to approximately 1 mm and smaller than or equal to approximately 2.0 mm. As a measure taken for rainbow unevenness or blackout, a high retardation transparent resin plate is preferably used as the second substrate 20 disposed on the panel back surface.

The sensor film 30 includes a sensor substrate formed from a translucent synthetic resin film, such as a polyethylene terephthalate (PET) resin, and a cyclo-olefin polymer (COP). A translucent electrode layer is disposed on the surface of the sensor film 30 facing the first substrate 10. The translucent electrode layer is formed from a translucent inorganic electroconductive material such as an indium tin oxide (ITO). The electrode layer is formed from an electroconductive nanowire such as a silver nanowire, a mesh metal layer such as a copper mesh, a gold mesh, or a silver mesh, a carbon nanotube, or an electroconductive polymer (PEDOT).

The sensor film 30 includes multiple electrode layers. These electrode layers are divided into two groups, and a capacitance is formed between a first group of the electrode layers and a second group of the electrode layers. When a pulsed driving voltage is applied to the first group of the electrode layers, current flows through the second group of the electrode layers during a rise time and a fall time of the pulse. The current value changes in accordance with the capacitance. Thus, the current value changes with a human finger approaching the convex surface of the substrate, so that the sensor film 30 can detect the point of the surface at which the finger has approached. Another possible structure may be a structure where multiple separate electrode layers are disposed on the surface of the sensor film 30, a driving voltage is sequentially applied to the respective electrode layers, and the current that flows between the electrode layer to which the driving voltage has been applied and the adjacent electrode layer is detected.

The sensor film 30 includes a lead portion 35 including a lead electrically connected with an electrode. The lead portion 35 extends to the back surface (the side of the second substrate 20 opposite to the side facing the sensor film 30) of the second substrate 20 through a through-hole 20h in the second substrate 20. Here, the through-hole 20h is an example of a non-lamination area 250 in which the second substrate 20 is absent when viewed in a lamination direction of the curved multilayer body 200.

An adhesive layer 45 is disposed between the first substrate 10 and the sensor film 30. The adhesive layer 45 is, for example, an optically clear adhesive (OCA), and allows the first substrate 10 and the sensor film 30 to be bonded together. An adhesive layer 25 is disposed between the second substrate 20 and the sensor film 30. For example, the adhesive layer 25 is an OCA similar to the adhesive layer 45, and allows the second substrate 20 and the sensor film 30 to be bonded together.

A decorating portion 401 is disposed on, for example, the back surface (facing the sensor film 30) of the first substrate 10. The decorating portion 401 is a black layer (colored layer) or a pattern layer disposed partially on the first substrate 10. For example, the peripheral area (that is, frame area) of the input device 1A is covered with the light-shielding decorating portion 401 to keep the portion (such as a lead) other than the detection area S from being seen from the outside.

In the input device 1A, the lamination structure including the curved first substrate 10, the curved second substrate 20, and the curved sensor film 30 constitutes the curved multilayer body 200 including the curved detection area, and the lead portion 35 electrically connected to the electrode of the sensor film 30 is drawn out to the back surface (facing the second substrate 20) of the curved multilayer body 200 through the through-hole 20h of the second substrate 20. Thus, in the input device 1A having an entirely curved surface including the detection area, the lead portion 35 is drawn out from a middle portion on the back surface, so that the lead portion 35 is prevented from being seen from the top surface. The lead portion 35 is prevented from being folded along the end surface of the input device 1A, and thus prevented from causing defects such as breakage due to being folded.

An intermediate member 50 is disposed on the outer side of the sensor film 30 between the first substrate 10 and the second substrate 20. The intermediate member 50 fills the gap between the sensor film 30 and each of the first substrate 10 and the second substrate 20 caused due to the thickness of the sensor film 30 to hold the sensor film 30 between the first substrate 10 and the second substrate 20. Examples usable as the intermediate member 50 include an OCA and a thermosetting adhesive. The intermediate member 50 can enhance adhesion between the first substrate 10 and the second substrate 20.

Now, a method for manufacturing an input device according to the present embodiment will be described.

(Input Device Manufacturing Method: Part 1)

Figure 3A:
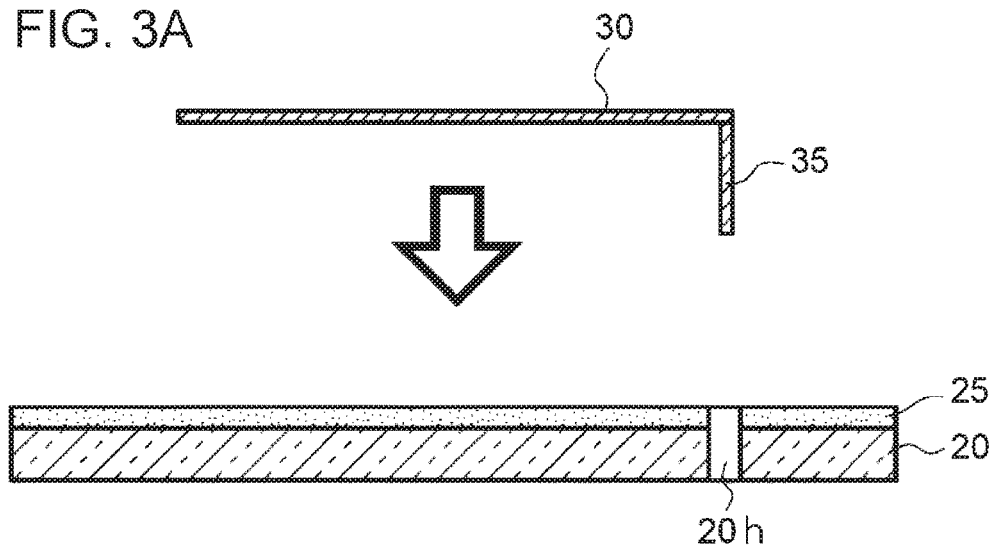
FIGS. 3A to 3C are schematic cross-sectional views of an input device manufacturing method (part 1)
Figure 3B:
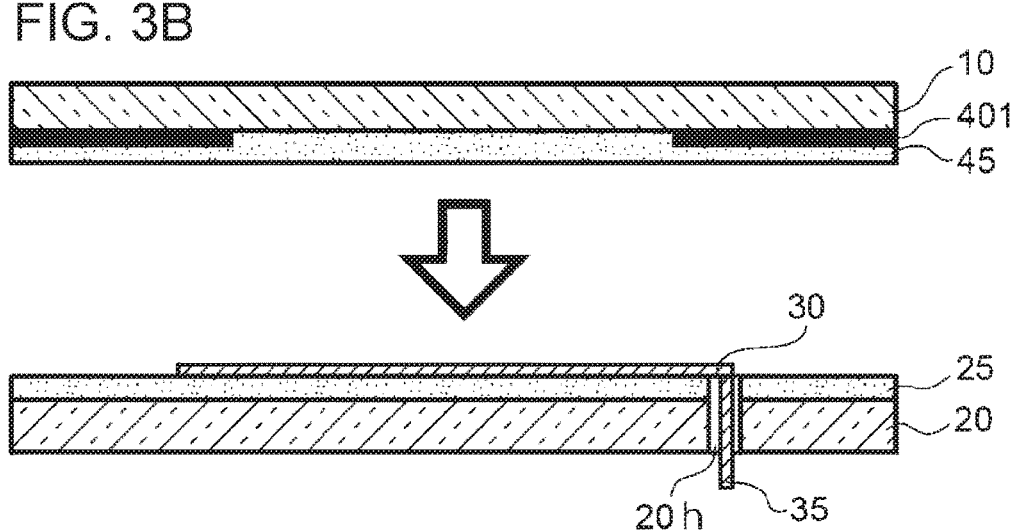
Figure 3C:
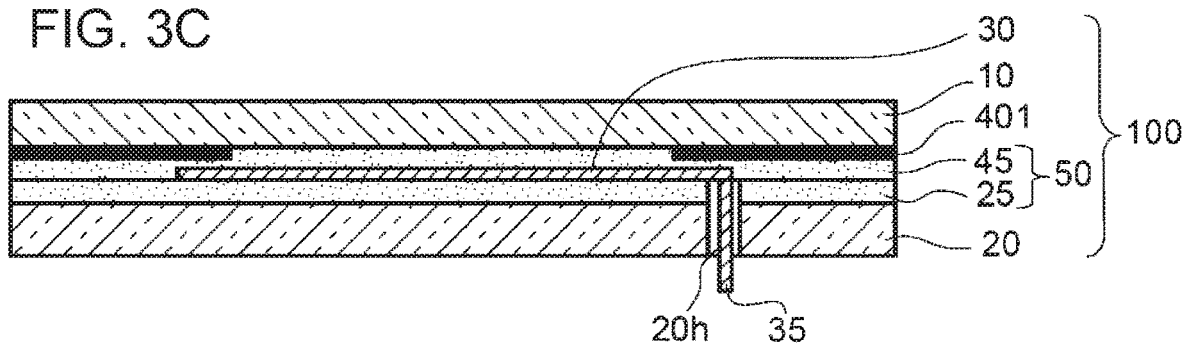
Figure 4:
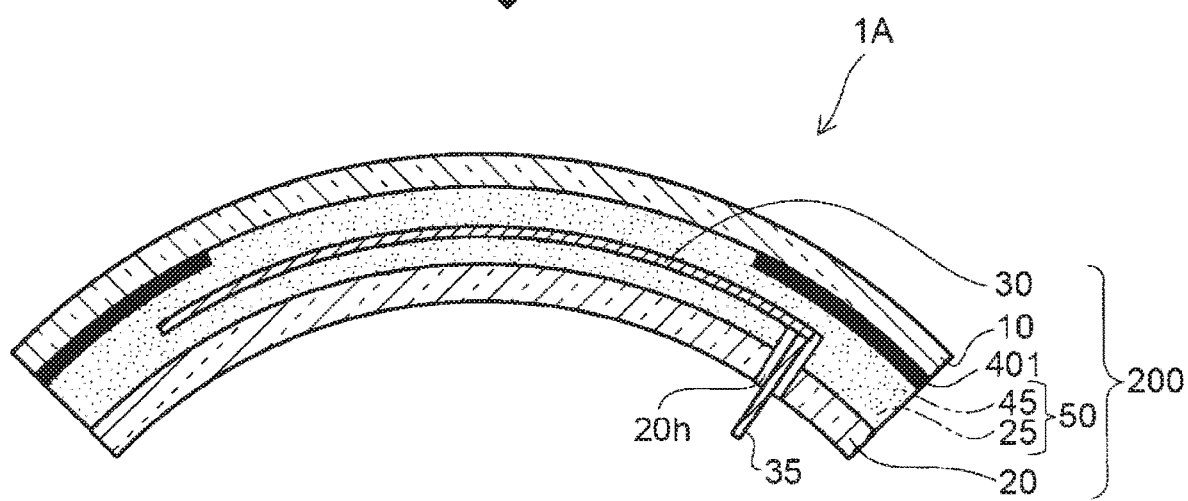
FIG. 4 is a schematic cross-sectional view of an input device manufacturing method (part 1)

FIG. 3A to FIG. 4 are schematic cross-sectional views of an input device manufacturing method (part 1).

First, as illustrated in FIGS. 3A to 3C, the first substrate 10, the second substrate 20, and the sensor film 30 are prepared. The first substrate 10 and the second substrate 20 are flat plates made of a translucent synthetic resin. The decorating portion 401 and the adhesive layer 45 are disposed on the first substrate 10. The adhesive layer 25 is disposed on the second substrate 20. The sensor film 30 is formed from a translucent resin film on which a translucent electrode is disposed.

Subsequently, as illustrated in FIG. 3A, the lead portion 35 on the sensor film 30 is directed to extend to one side. If the lead portion 35 is integrated with the sensor substrate of the sensor film 30, the lead portion 35 is to be folded to one side. If the lead portion 35 and the sensor substrate are separate, the lead portion 35 is to be connected to the sensor substrate to extend to one side.

Subsequently, the lead portion 35 of the sensor film 30 is inserted into the through-hole 20h formed in the second substrate 20. The adhesive layer (bonding layer) 25 is disposed on the top surface of the second substrate 20. The sensor film 30 is attached to the top surface of the second substrate 20 with the adhesive layer 25. The lead portion 35 is inserted into the through-hole 20h of the second substrate 20 to extend to the opposite side (back surface) of the second substrate 20 opposite to the side facing the sensor film 30.

Subsequently, as illustrated in FIG. 3B, the first substrate 10 having the decorating portion 401 and the second substrate 20 to which the sensor film 30 is attached are bonded together. The adhesive layer (bonding layer) 45 is disposed on the surface (back surface) of the first substrate 10 on which the decorating portion 401 is disposed, and the adhesive layer 45 allows the first substrate 10 and the second substrate 20 to be bonded together.

Thus, as illustrated in FIG. 3C, a flat multilayer body 100 in which the decorating portion 401 and the sensor film 30 are held between the first substrate 10 and the second substrate 20 is formed (lamination step). The flat multilayer body 100 illustrated in FIG. 3C includes the intermediate member 50. The intermediate member 50 is constituted of the adhesive layers 25 and 45 on the outer side of the sensor film 30 between the decorating portion 401 and the second substrate 20. In the state where the flat multilayer body 100 is formed, the adhesive layers 25 and 45 between the above components are temporarily cured. The through-hole 20h is filled with the adhesive layers 25 and 45 with pressure bonding between the components constituting the flat multilayer body 100.

Subsequently, as illustrated in FIG. 4, an upper die 510 and a lower die 520 corresponding to the intended curved shapes are prepared, and the flat multilayer body 100 is placed between the upper die 510 and the lower die 520 to undergo press forming. During this pressing, the lead portion 35 is inserted into a recess 521 in the lower die 520. Thus, the lead portion 35 is prevented from being broken during pressing, so that the curved multilayer body 200 can be formed highly accurately. In the press forming, the flat multilayer body 100 is bent with heat to follow the shapes of the upper die 510 and the lower die 520, and the adhesive layers 25 and 45 are completely cured at a predetermined temperature. Thus, the flat multilayer body 100 is bent to follow the curved shapes of the upper die 510 and the lower die 520, so that the curved multilayer body 200 retaining the curved shape is formed (bending step). The input device 1A is complete by forming the curved multilayer body 200.

In this manufacturing method, the flat multilayer body 100 is formed by holding the sensor film between the flat first substrate 10 and the flat second substrate 20. Thus, the sensor film 30, the first substrate 10, and the second substrate 20 can secure high adhesion therebetween.

The flat multilayer body 100 is bent by press forming while the sensor film 30, the first substrate 10, and the second substrate 20 firmly adhere to each other. Thus, the first substrate 10, the second substrate 20, and the sensor film 30 can be integrally bent. Specifically, instead of separately bending the first substrate 10, the second substrate 20, and the sensor film 30 and then bringing them together, they are integrally bent together as the flat multilayer body 100. Thus, the flat multilayer body 100 has a smoothly curved shape without misalignment or gaps between the components.

The first substrate 10 and the second substrate 20 of the curved multilayer body 200 are tightly bonded together with the adhesive layer 45 and 25 at the peripheral portion of the sensor film 30, and are thus more likely to prevent springback after being bent. The sensor film 30 is held between the first substrate 10 and the second substrate 20. Thus, the sensor film 30 having a curved shape can retain high rigidity.

This manufacturing method enables manufacturing of a structure of the input device 1A having a curved shape in which the lead portion 35 of the sensor film 30 is drawn to the back surface through the through-hole 20h of the second substrate 20 at a portion immediately outside of the detection area without being wired from the side wall portion of the input device 1A to the back surface.

This structure in which the lead portion 35 is drawn through the through-hole 20h to the back surface can more effectively prevent detection errors, responsivity degradation, or noise intrusion in a non-detection area than the structure in which the lead is wired from the side wall portion to the back surface.

In this manufacturing method, the decorating portion 401 is disposed in advance on the first substrate 10. Thus, the decorating portion 401 can be accurately and simply disposed at an appropriate position.

(Input Device Manufacturing Method: Part 2)

FIG. 5A to FIG. 7 are schematic cross-sectional views of an input device manufacturing method (part 2).

Figure 5A:
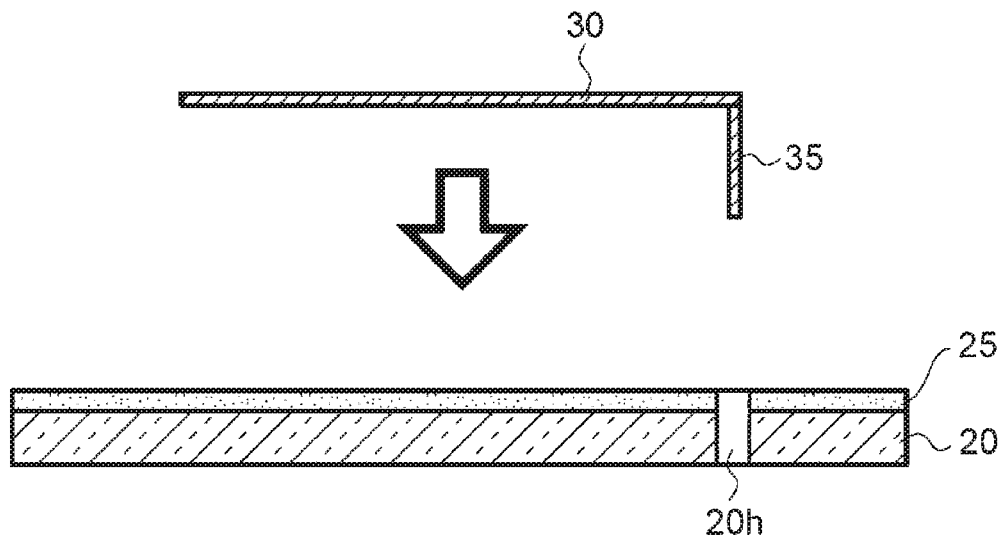
FIGS. 5A and 5B are schematic cross-sectional views of an input device manufacturing method (part 2)
Figure 5B:
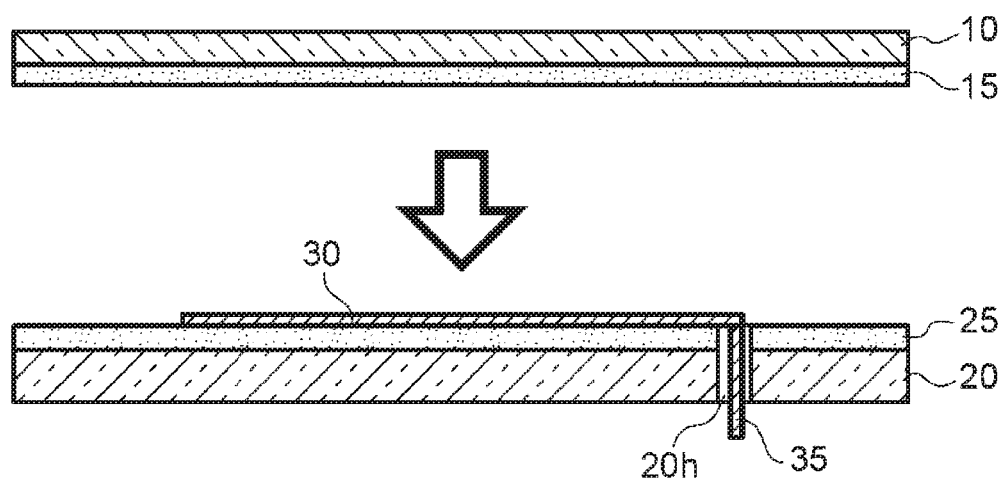

Firstly, as illustrated in FIGS. 5A and 5B, the first substrate 10, the second substrate 20, and the sensor film 30 are prepared. The first substrate 10 and the second substrate 20 are flat plates made of a translucent synthetic resin. The sensor film 30 is formed from a translucent resin film on which a translucent electrode is mounted.

Subsequently, as illustrated in FIG. 5A, the lead portion 35 on the sensor film 30 is directed to extend to one side. If the lead portion 35 is integrated with the sensor substrate of the sensor film 30, the lead portion 35 is to be folded to one side. If the lead portion 35 and the sensor substrate are separate, the lead portion 35 is to be connected to the sensor substrate to extend to one side.

Subsequently, the lead portion 35 of the sensor film 30 is inserted into the through-hole 20h formed in the second substrate 20. The adhesive layer (bonding layer) 25 is disposed on the top surface of the second substrate 20. The sensor film 30 is attached to the top surface of the second substrate 20 with the adhesive layer 25. The lead portion 35 is inserted into the through-hole 20h of the second substrate 20 to extend to the opposite side (back surface) of the second substrate 20 opposite to the side facing the sensor film 30.

Subsequently, as illustrated in FIG. 5B, the first substrate 10 is bonded to the top surface of the second substrate 20. An adhesive layer (bonding layer) 15 is disposed on the surface (back surface) of the first substrate 10 facing the second substrate 20. The first substrate 10 is fixed to the top surface of the second substrate 20 with the adhesive layers 15 and 25. Thus, the sensor film 30 is held between the first substrate 10 and the second substrate 20.

Figure 6A:
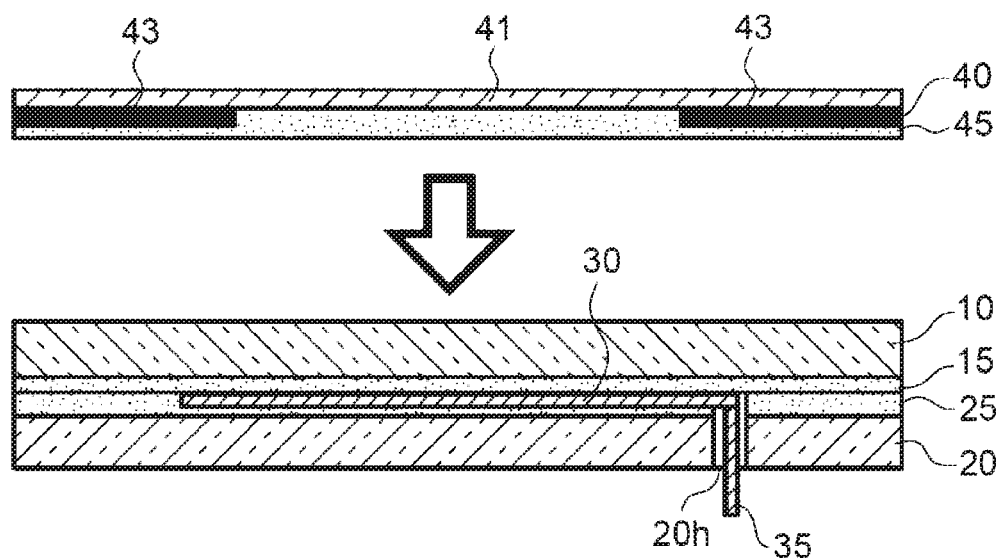
FIGS. 6A and 6B are schematic cross-sectional views of an input device manufacturing method (part 2)

Subsequently, as illustrated in FIG. 6A, a transparent film 41 to which the decorating film 40 is disposed is bonded to the surface (top surface) of the first substrate 10 opposite to the surface facing the second substrate 20. The adhesive layer (bonding layer) 45 is disposed on the surface (back surface) of the transparent film 41 facing the first substrate 10. The transparent film 41 on which a decorating film 40 is disposed is bonded to the top surface of the first substrate 10 with the adhesive layer 45.

Figure 6B:
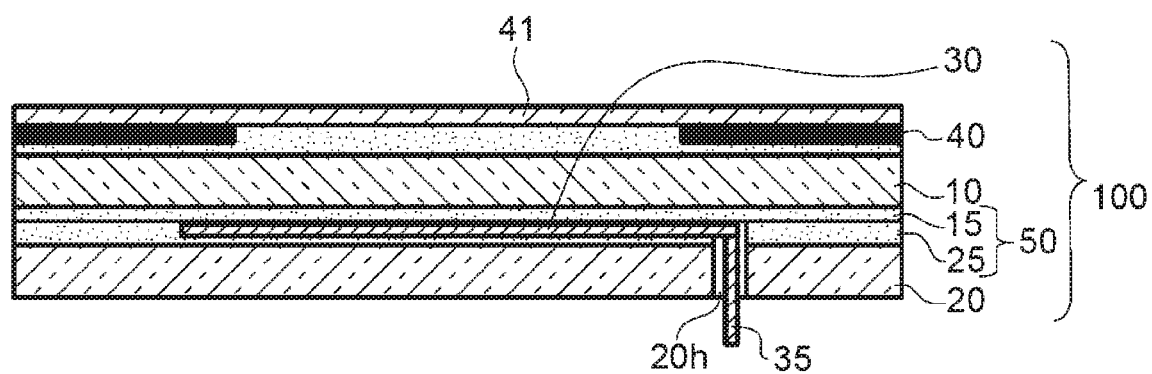

Thus, as illustrated in FIG. 6B, a flat multilayer body 100 including the sensor film 30 held between the first substrate 10 and the second substrate 20 is formed (lamination step). The flat multilayer body 100 illustrated in FIG. 6B includes the decorating film 40 and the intermediate member 50. The intermediate member 50 is constituted of the adhesive layers 15 and 25 on the outer side of the sensor film 30 between the first substrate 10 and the second substrate 20. In the state where the flat multilayer body 100 is formed, the adhesive layers 15 and 25 between the above components are temporarily cured. The through-hole 20h is filled with the adhesive layers 15 and 25 with pressure bonding between the components constituting the flat multilayer body 100.

Figure 7:
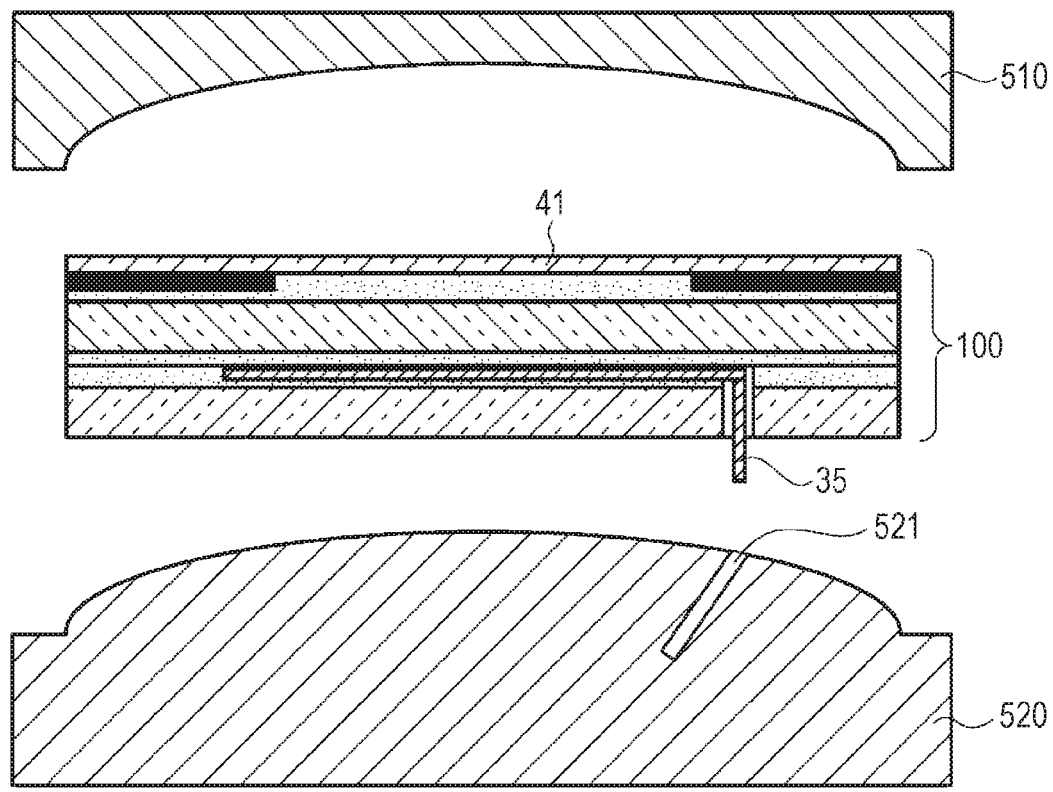
FIG. 7 is a schematic cross-sectional view of an input device manufacturing method (part 2)
Figure 7:
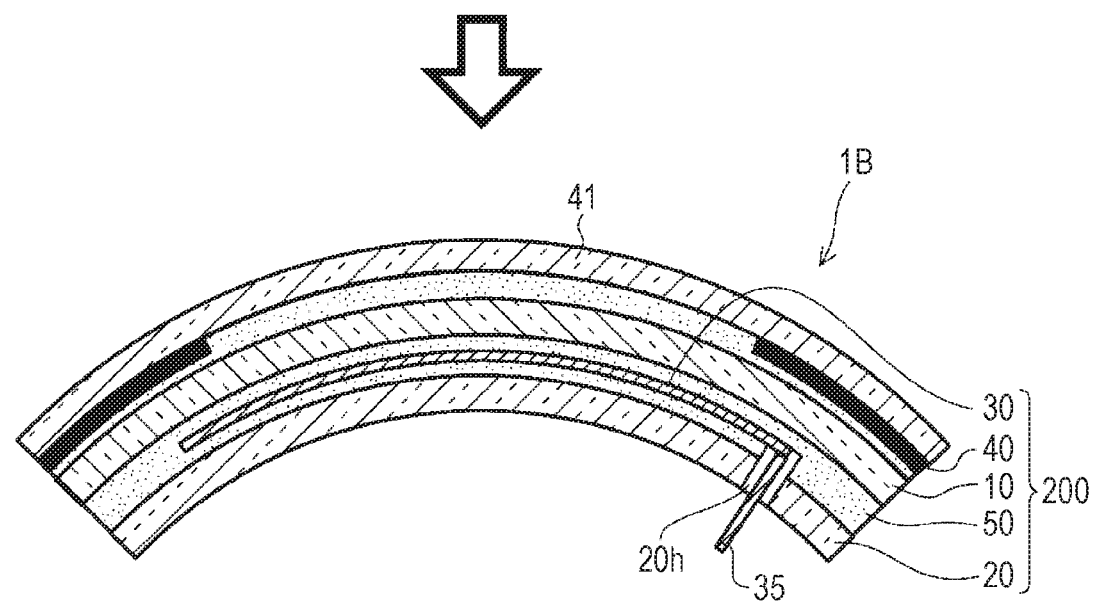

Subsequently, as illustrated in FIG. 7, the upper die 510 and the lower die 520 corresponding to the intended curved shapes are prepared, and the flat multilayer body 100 is placed between the upper die 510 and the lower die 520 to undergo press forming. During this pressing, the lead portion 35 is inserted into the recess 521 in the lower die 520. Thus, the lead portion 35 is prevented from being broken during pressing, so that the curved multilayer body 200 can be formed highly accurately. In the press forming, the flat multilayer body 100 is bent with heat to follow the shapes of the upper die 510 and the lower die 520, and the adhesive layers 15, 25, and 45 are completely cured at a predetermined temperature. Thus, the flat multilayer body 100 is bent to follow the curved shapes of the upper die 510 and the lower die 520, so that the curved multilayer body 200 retaining the curved shape is formed (bending step). An input device 1B is complete by forming the curved multilayer body 200. The heating temperature in the press forming (first temperature) and the heating temperature for completely curing the adhesive layers 15, 25, and 45 (second temperature) may be the same or different. Alternatively, complete curing may be performed by removing the flat multilayer body 100 that has undergone curving from the die set (upper die 510 and lower die 520) for press forming, and separately placing it into, for example, a relax oven.

With this manufacturing method, the flat multilayer body 100 is formed by holding the sensor film between the flat first substrate 10 and the flat second substrate 20, so that the sensor film 30, the first substrate 10, and the second substrate 20 can secure high adhesion therebetween.

The flat multilayer body 100 is bent by press forming while the sensor film 30, the first substrate 10, and the second substrate 20 are firmly adhering to each other. Thus, the first substrate 10, the second substrate 20, and the sensor film 30 can be integrally bent. Specifically, instead of separately bending the first substrate 10, the second substrate 20, and the sensor film 30 and then bringing them together, they are integrally bent together as the flat multilayer body 100. Thus, the flat multilayer body 100 has a smoothly curved shape without misalignment or gaps between the components.

The first substrate 10 and the second substrate 20 of the curved multilayer body 200 are tightly bonded together with the adhesive layer 15 and 25 at the peripheral portion of the sensor film 30, and are thus more likely to prevent springback after being bent. The sensor film 30 is held between the first substrate 10 and the second substrate 20. Thus, the sensor film 30 having a curved shape can retain high rigidity.

This manufacturing method facilitates manufacturing of a structure of the input device 1B having a curved shape in which the lead portion 35 of the sensor film 30 is drawn to the back surface through the through-hole 20h of the second substrate 20 at a portion immediately outside of the detection area without being wired from the side wall portion of the input device 1B to the back surface.

This structure in which the lead portion 35 is drawn through the through-hole 20h to the back surface can more effectively prevent detection errors, responsivity degradation, or noise intrusion in a non-detection area than the structure in which the lead is wired from the side wall portion to the back surface.

(Input Device Manufacturing Method: Part 3)

FIG. 8A to FIG. 10 are schematic cross-sectional views illustrating an input device manufacturing method (part 3).

Figure 8A:
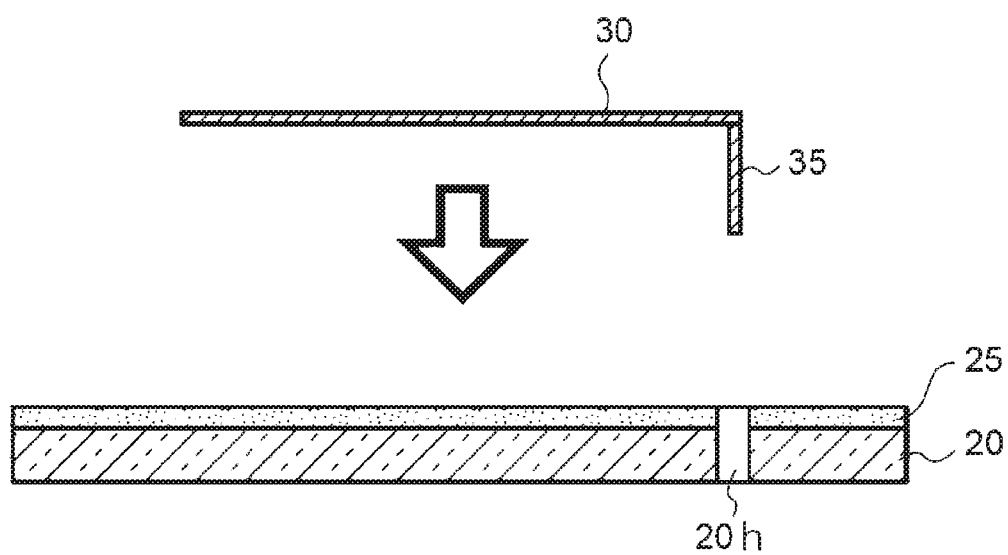
FIGS. 8A and 8B are schematic cross-sectional views of an input device manufacturing method (part 3)
Figure 8B:
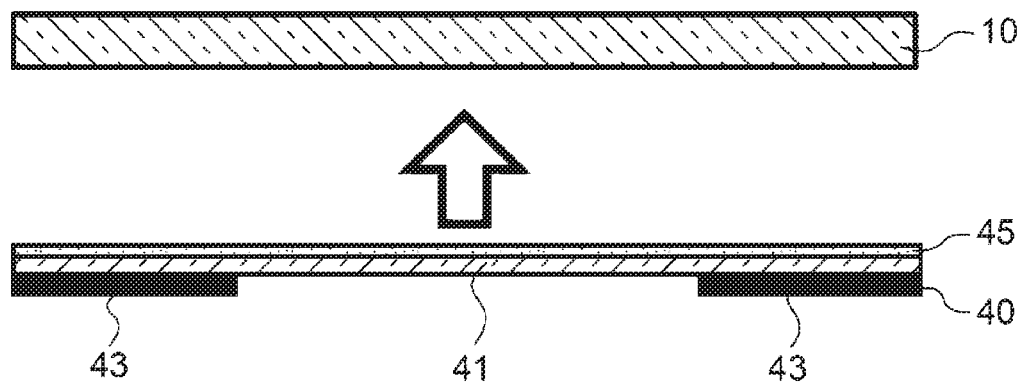

Firstly, as illustrated in FIGS. 8A and 8B, the first substrate 10, the second substrate 20, and the sensor film 30 are prepared. The first substrate 10, the second substrate 20, and the sensor film 30 are made of the same materials and have the same structures as in the case of the above manufacturing method (part 1).

Subsequently, as illustrated in FIG. 8A, the lead portion 35 on the sensor film 30 is directed to extend to one side. If the lead portion 35 is integrated with the sensor substrate of the sensor film 30, the lead portion 35 is to be folded to one side. If the lead portion 35 and the sensor substrate are separate, the lead portion 35 is to be connected to the sensor substrate to extend to one side.

Subsequently, the lead portion 35 of the sensor film 30 is inserted into the through-hole 20h formed in the second substrate 20. The adhesive layer (bonding layer) 25 is disposed on the top surface of the second substrate 20. The sensor film 30 is attached to the top surface of the second substrate 20 with the adhesive layer 25. The lead portion 35 is inserted into the through-hole 20h of the second substrate 20 to extend to the opposite side (back surface) of the second substrate 20 opposite to the side facing the sensor film 30.

Subsequently, as illustrated in FIG. 8B, the transparent film 41 on which the decorating film 40 is disposed is bonded to one surface (back surface) of the first substrate 10. An adhesive layer (bonding layer) 45 is disposed on the surface (top side) of the transparent film 41 facing the first substrate 10. The transparent film 41 on which the decorating film 40 is disposed is bonded to the back surface of the first substrate 10 with the adhesive layer 45.

Figure 9A:
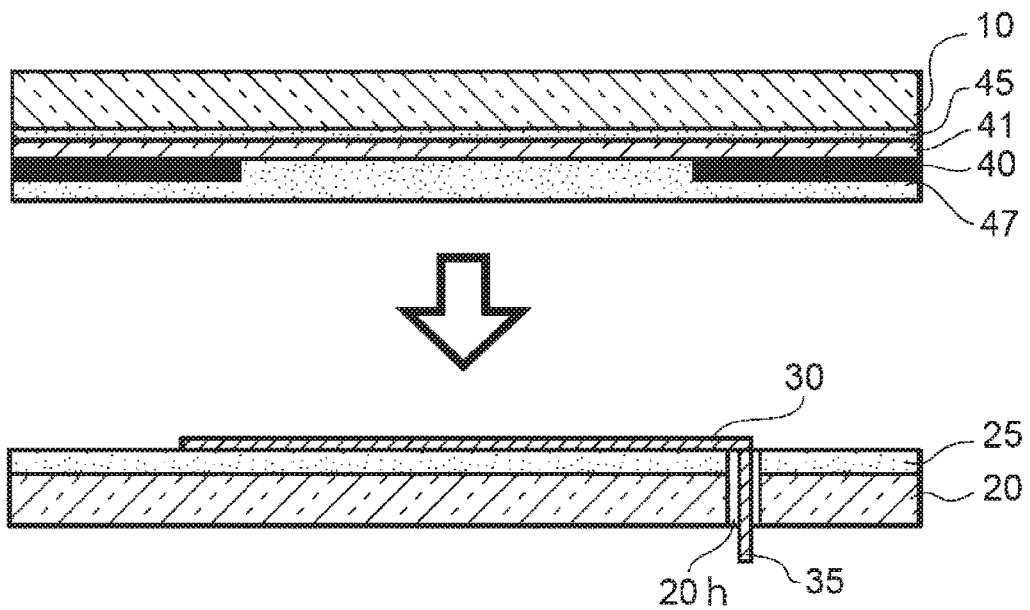
FIGS. 9A and 9B are schematic cross-sectional views of an input device manufacturing method (part 3)

Subsequently, as illustrated in FIG. 9A, the first substrate 10 to which the transparent film 41 is bonded and the second substrate 20 to which the sensor film 30 is attached are bonded together. An adhesive layer (bonding layer) 47 is disposed on the surface (back surface) of the transparent film 41 facing the second substrate 20 on which the decorating film 40 is disposed. The adhesive layer 47 allows the first substrate 10 and the second substrate 20 to be bonded together.

Figure 9B:
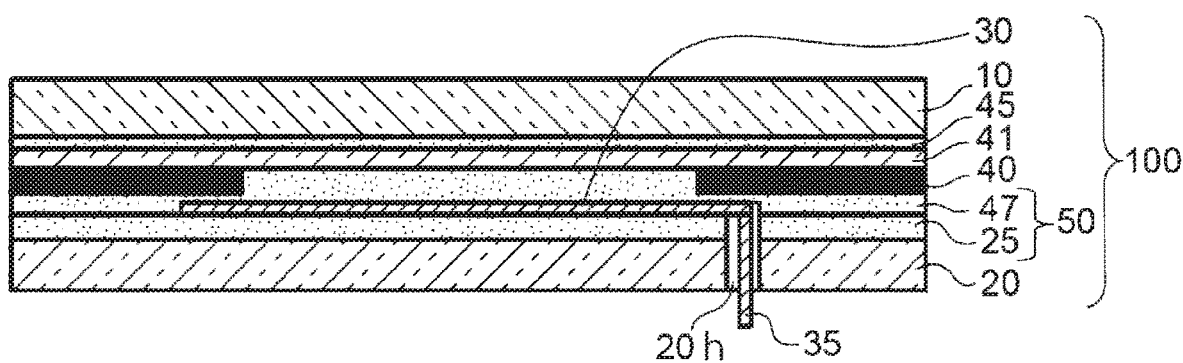

Thus, as illustrated in FIG. 9B, a flat multilayer body 100 in which the decorating film 40 and the sensor film 30 are held between the first substrate 10 and the second substrate 20 is formed (lamination step). The flat multilayer body 100 illustrated in FIG. 9B includes the intermediate member 50. The intermediate member 50 is constituted of the adhesive layers 25 and 47 on the outer side of the sensor film 30 between the decorating film 40 and the second substrate 20. In the state where the flat multilayer body 100 is formed, the adhesive layers 25, 45, and 47 between the above components are temporarily cured. The through-hole 20h is filled with the adhesive layers 25 and 47 with pressure bonding between the components constituting the flat multilayer body 100.

Figure 10:
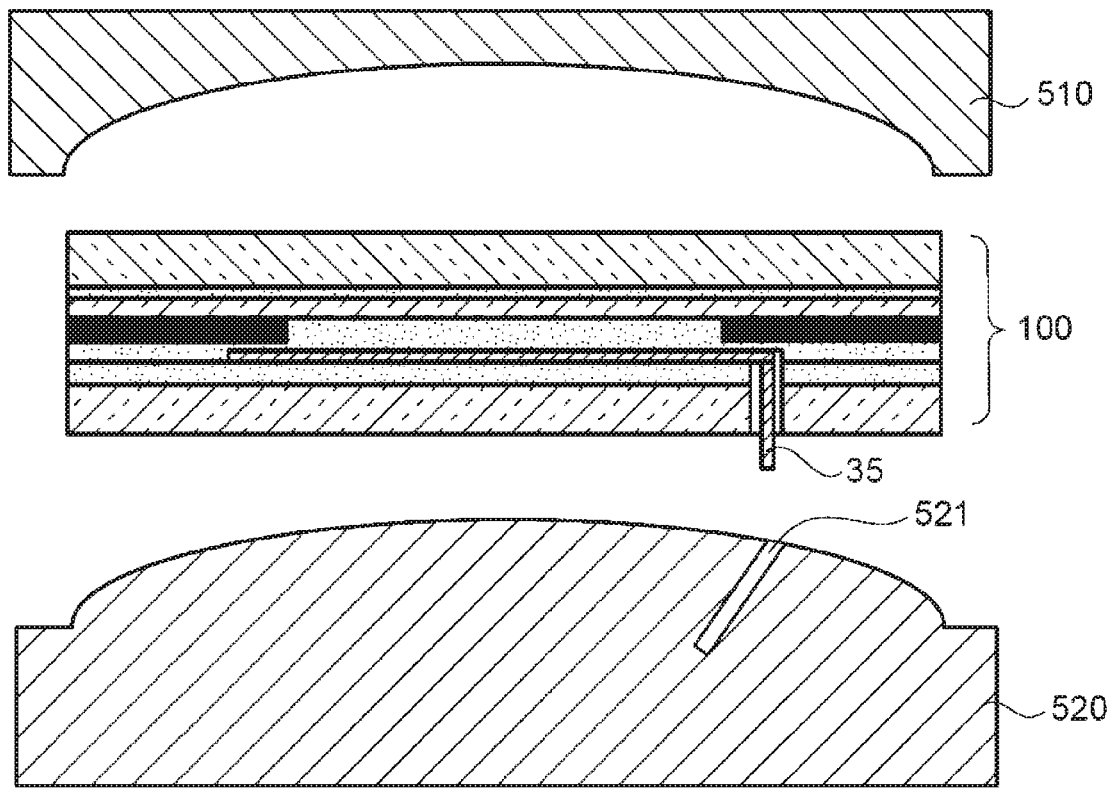
FIG. 10 is a schematic cross-sectional view of an input device manufacturing method (part 3)
Figure 10:
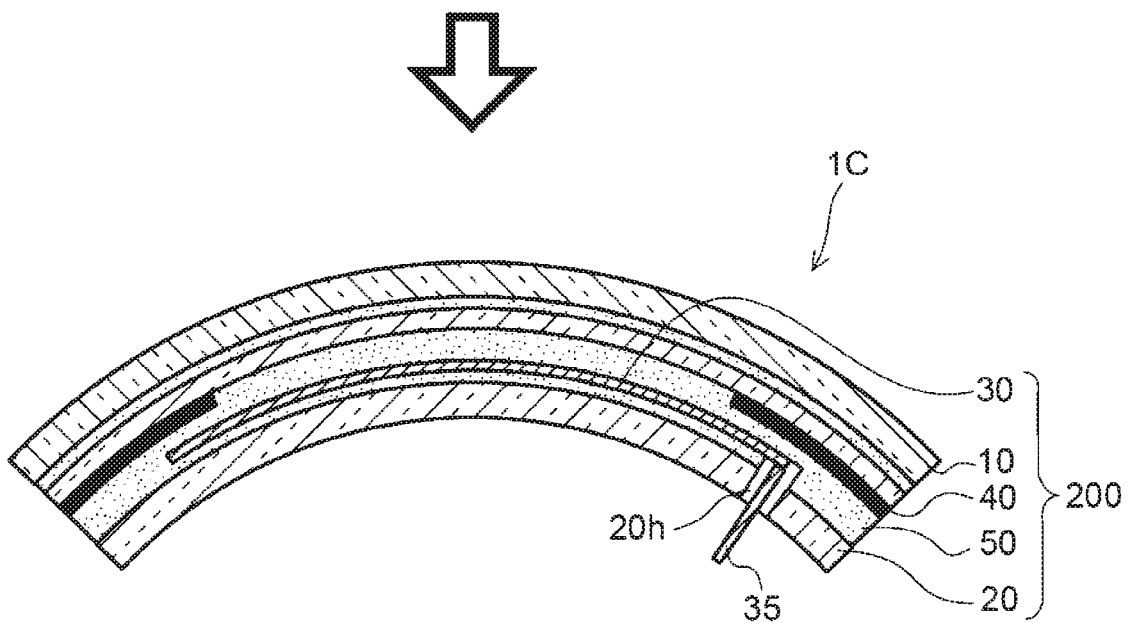

Subsequently, as illustrated in FIG. 10, the upper die 510 and the lower die 520 corresponding to the intended curved shapes are prepared, and the flat multilayer body 100 is placed between the upper die 510 and the lower die 520 to undergo press forming. During this pressing, the lead portion 35 is inserted into the recess 521 in the lower die 520. Thus, the lead portion 35 is prevented from being broken during pressing, so that the curved multilayer body 200 can be formed highly accurately. In the press forming, the flat multilayer body 100 is bent with heat to follow the shapes of the upper die 510 and the lower die 520, and the adhesive layers 25, 45, and 47 are completely cured at a predetermined temperature. Thus, the flat multilayer body 100 is bent to follow the curved shapes of the upper die 510 and the lower die 520, so that the curved multilayer body 200 retaining the curved shape is formed (bending step). An input device 1C is complete by forming the curved multilayer body 200.

In addition to the above manufacturing method (part 1), this manufacturing method can retain the decorating film 40 held between the first substrate 10 and the second substrate 20 with high adhesion even having a curved shape.

(Input Device Manufacturing Method: Part 4)

FIG. 11A to FIG. 13 are schematic cross-sectional views of an input device manufacturing method (part 4).

Firstly, as illustrated in FIG. 11, the first substrate 10, the second substrate 20, and the sensor film 30 are prepared. The first substrate 10, the second substrate 20, and the sensor film 30 are made of the same materials and have the same structures as in the case of the above manufacturing method (part 1).

Figure 11A:
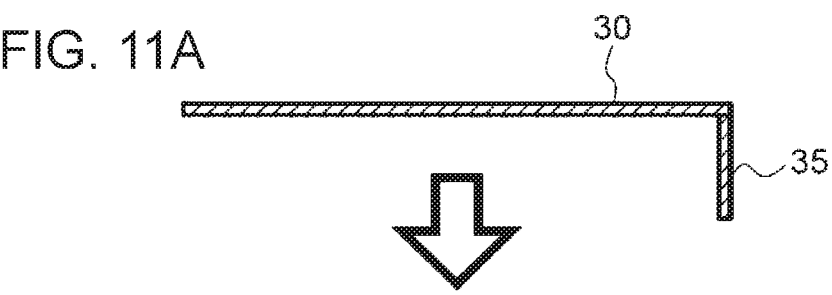
FIGS. 11A to 11C are schematic cross-sectional views of an input device manufacturing method (part 4)

Subsequently, as illustrated in FIG. 11A, the lead portion 35 on the sensor film 30 is directed to extend to one side. If the lead portion 35 is integrated with the sensor substrate of the sensor film 30, the lead portion 35 is to be folded to one side. If the lead portion 35 and the sensor substrate are separate, the lead portion 35 is to be connected to the sensor substrate to extend to one side.

Figure 11B:
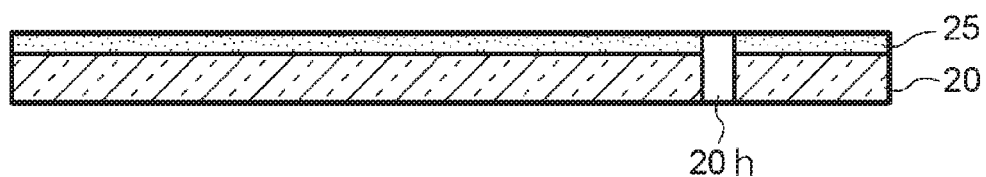
Figure 11B:
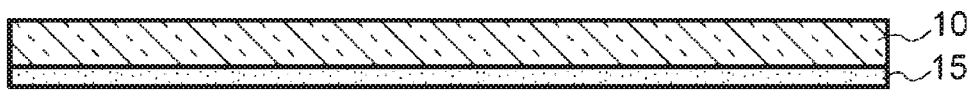
Figure 11B:
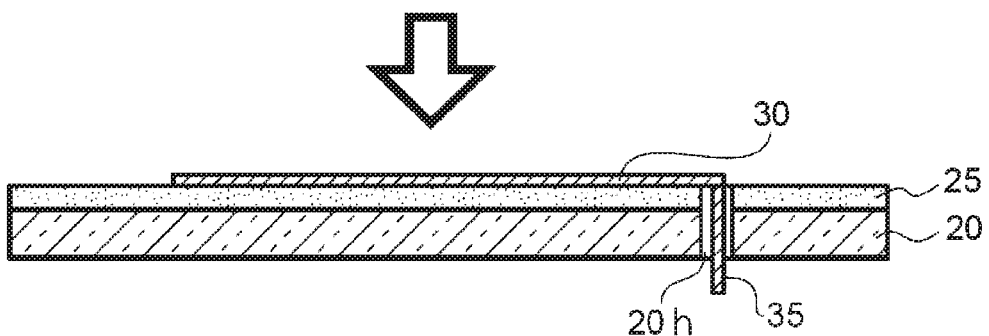

Subsequently, as illustrated in FIG. 11B, the first substrate 10 is bonded to the top surface of the second substrate 20. An adhesive layer (bonding layer) 15 is disposed on the surface (back surface) of the first substrate 10 facing the second substrate 20. The first substrate 10 is fixed to the top surface of the second substrate 20 with the adhesive layers 15 and 25. Thus, as illustrated in FIG. 11C, the flat multilayer body 100 including the sensor film 30 held between the first substrate 10 and the second substrate 20 is formed (lamination step).

Figure 11C:
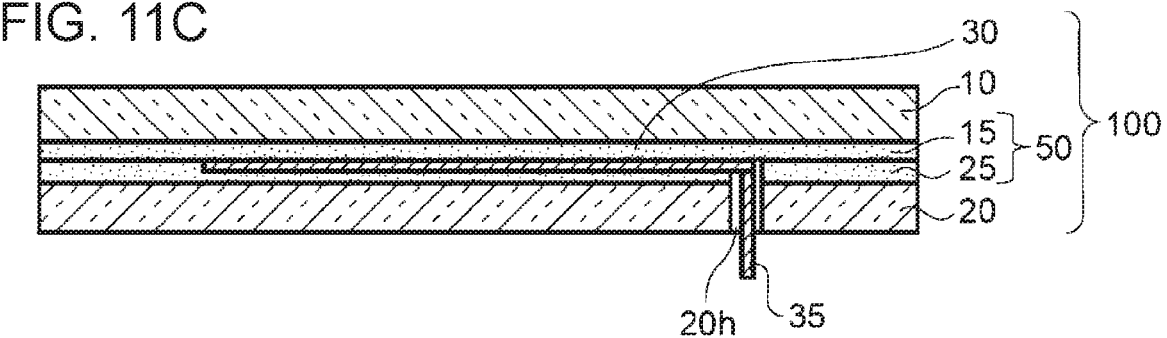

The flat multilayer body 100 illustrated in FIG. 11C includes the intermediate member 50. The intermediate member 50 is constituted of the adhesive layers 15 and 25 on the outer side of the sensor film 30 between the first substrate 10 and the second substrate 20. In the state where the flat multilayer body 100 is formed, the adhesive layers 15 and 25 between the above components are temporarily cured. The through-hole 20h is filled with the adhesive layers 15 and 25 with pressure bonding between the components constituting the flat multilayer body 100.

Figure 12:
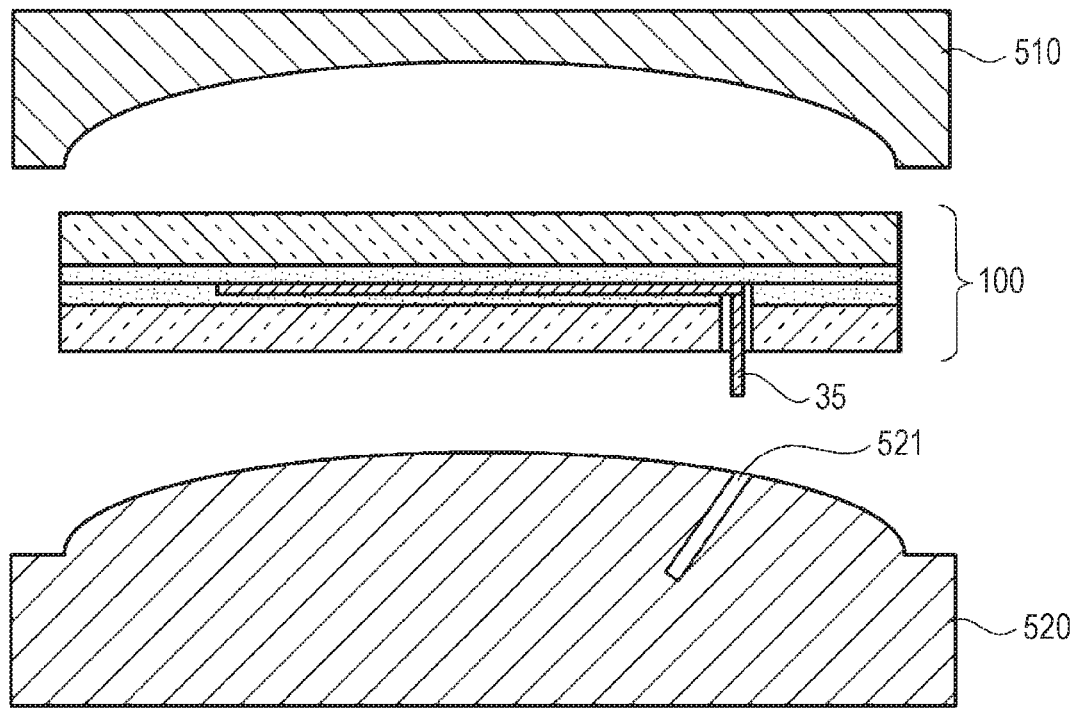
FIG. 12 is a schematic cross-sectional view of an input device manufacturing method (part 4)
Figure 12:
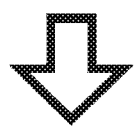
Figure 12:
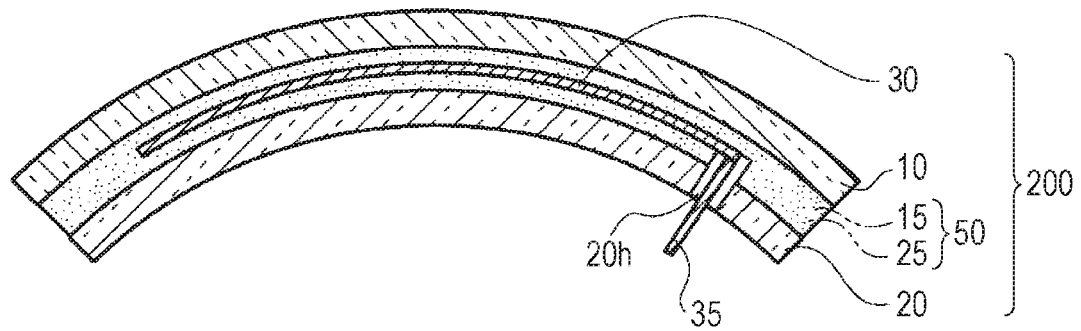

Subsequently, as illustrated in FIG. 12, the upper die 510 and the lower die 520 corresponding to the intended curved shapes are prepared, and the flat multilayer body 100 is placed between the upper die 510 and the lower die 520 to undergo press forming. During this pressing, the lead portion 35 is inserted into the recess 521 in the lower die 520. Thus, the lead portion 35 is prevented from being broken during pressing, so that the curved multilayer body 200 can be formed highly accurately. In the press forming, the flat multilayer body 100 is bent with heat to follow the shapes of the upper die 510 and the lower die 520, and the adhesive layers 15 and 25 are completely cured at a predetermined temperature. Thus, the flat multilayer body 100 is bent to follow the curved shapes of the upper die 510 and the lower die 520, so that the curved multilayer body 200 retaining the curved shape is formed (bending step).

Figure 13:
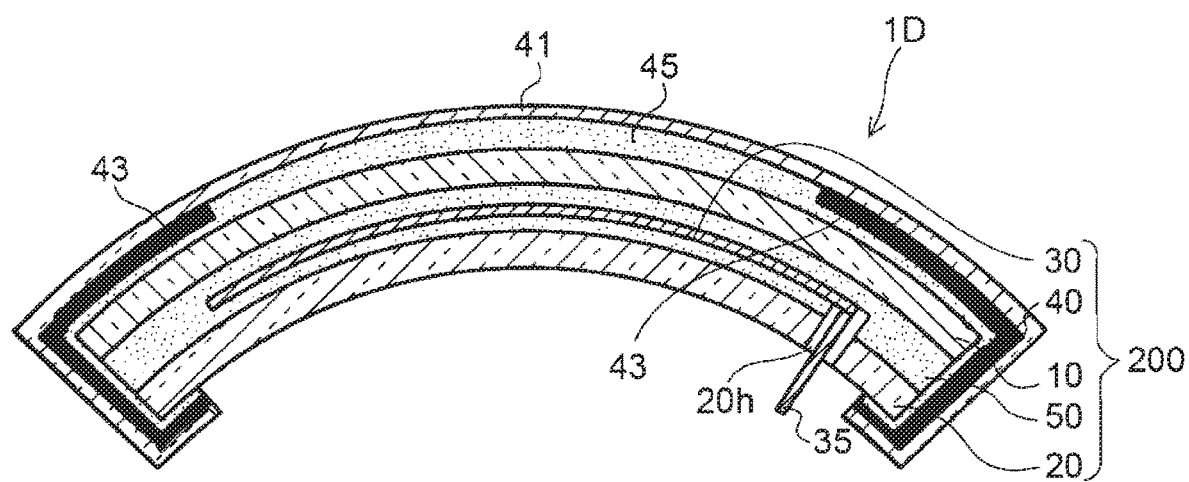
FIG. 13 is a schematic cross-sectional view of an input device manufacturing method (part 4)

Subsequently, as illustrated in FIG. 13, the transparent film 41 on which the decorating film 40 is disposed is attached to the outer side of the curved multilayer body 200 with an adhesive layer (bonding layer) 45 interposed therebetween. The transparent film 41 on which the decorating film 40 is disposed is disposed on the top surface of the curved multilayer body 200 by, for example, a three-dimension overlay method (TOM) to tightly adhere to the surface. Thus, an input device 1D is complete.

With this manufacturing method, in addition to the effects the same as those in the case of the above manufacturing method (part 1), the side end surface of the curved multilayer body 200 can be covered with a decorating layer 43 of the decorating film 40, and, thus, stray light that is to enter the inside from the side end surface of the curved multilayer body 200 can be effectively blocked.

(Input Device Manufacturing Method: Part 5)

FIG. 14A to FIG. 16 are schematic cross-sectional views illustrating an input device manufacturing method (part 5).

Firstly, as illustrated in FIG. 14, the first substrate 10, the second substrate 20, and the sensor film 30 are prepared. The first substrate 10, the second substrate 20, and the sensor film 30 are made of the same materials and have the same structures as in the case of the above manufacturing method (part 1), except that an adhesive layer (bonding layer) 37 is disposed on one surface (top surface) of the sensor film 30, and an adhesive layer (bonding layer) 39 is disposed on the other surface (back surface).

Figure 14A:
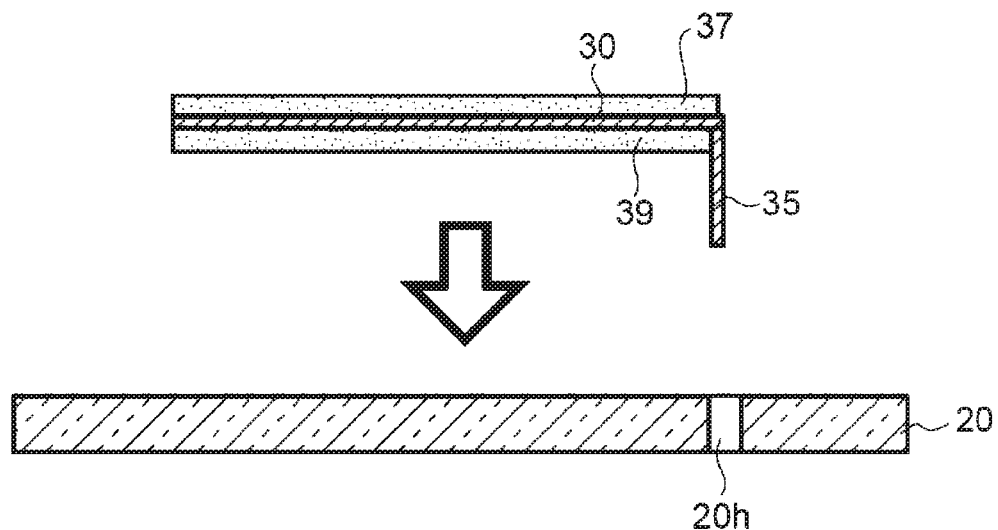
FIGS. 14A and 14B are schematic cross-sectional views of an input device manufacturing method (part 5)

Subsequently, as illustrated in FIG. 14A, the lead portion 35 on the sensor film 30 is directed to extend to one side. If the lead portion 35 is integrated with the sensor substrate of the sensor film 30, the lead portion 35 is to be folded to one side. If the lead portion 35 and the sensor substrate are separate, the lead portion 35 is to be connected to the sensor substrate to extend to one side.

Subsequently, the lead portion 35 of the sensor film 30 is inserted into the through-hole 20h formed in the second substrate 20. The sensor film 30 is attached to the top surface of the second substrate 20 with the adhesive layer 39 on the back surface. The lead portion 35 is inserted into the through-hole 20h of the second substrate 20 to extend to the opposite side (back surface) of the second substrate 20 opposite to the side facing the sensor film 30.

Figure 14B:
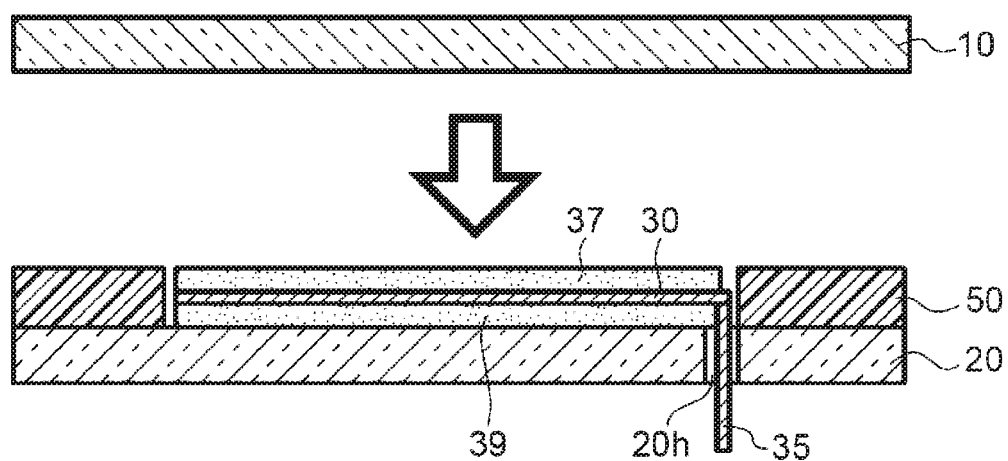

Subsequently, as illustrated in FIG. 14B, the first substrate 10 and the second substrate 20 to which the sensor film 30 is attached are bonded together. The intermediate member 50 is disposed on the outer side of the sensor film 30 on the surface (top surface) of the second substrate 20 facing the first substrate 10. The intermediate member 50 may be made of an OCA or another material. Examples of the material of the intermediate member 50 include a cured object of a thermosetting material including a thermosetting resin such as epoxy resin. The intermediate member 50 preferably has a function of fixing the first substrate 10 and the second substrate 20 thereon. An example is a case where the intermediate member 50 includes a cured object of a thermosetting adhesive. An opaque material may be used for the intermediate member 50.

The first substrate 10 is bonded to the second substrate 20 with the intermediate member 50 and the adhesive layer 37 disposed on the top surface of the sensor film 30. Thus, the sensor film 30 is held between the first substrate 10 and the second substrate 20. In this bonding, the adhesive layer 37 and the intermediate member 50 are interposed over a wide area between the first substrate 10 and the second substrate 20, so that the first substrate 10 and the second substrate 20 can be firmly bonded together.

Figure 15A:
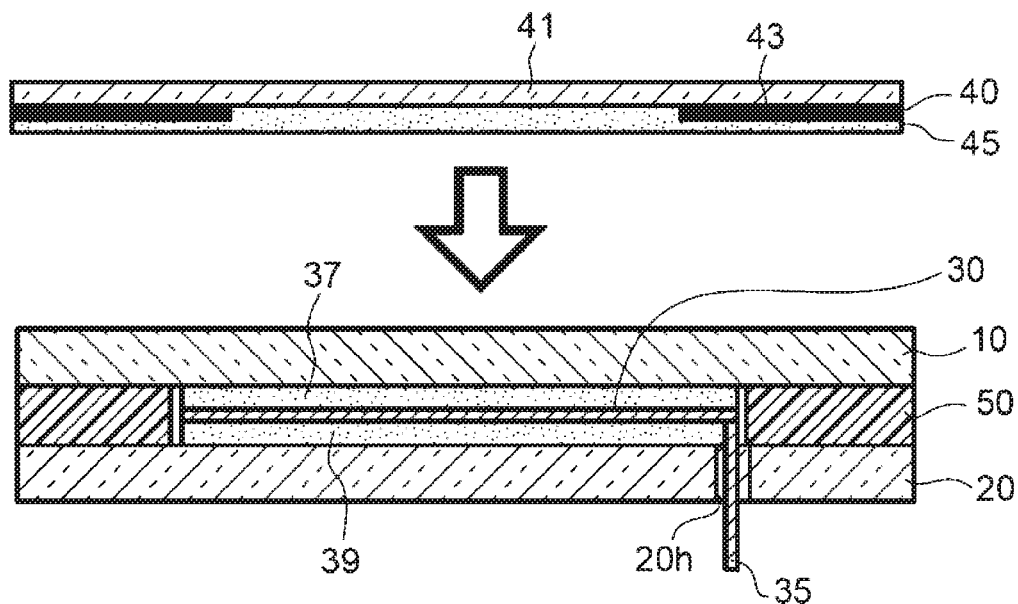
FIGS. 15A and 15B are schematic cross-sectional views of an input device manufacturing method (part 5)

Subsequently, as illustrated in FIG. 15A, the transparent film 41 on which the decorating film 40 is disposed is bonded to the surface (top surface) of the first substrate 10 opposite to the surface facing the second substrate 20. The adhesive layer (bonding layer) 45 is disposed on the surface of the transparent film 41 facing the first substrate 10 (back surface). The transparent film 41 on which the decorating film 40 is disposed is bonded to the top surface of the first substrate 10 with the adhesive layer 45.

Figure 15B:
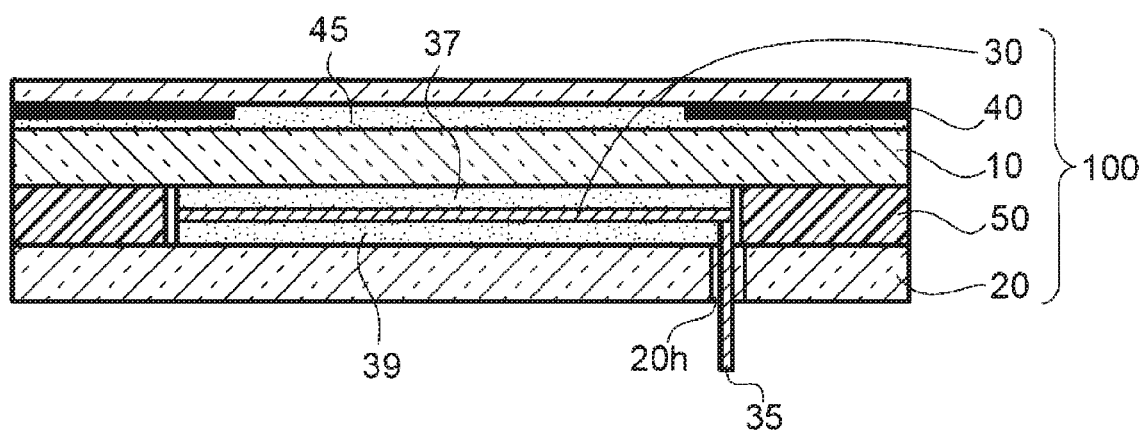

Thus, as illustrated in FIG. 15B, a flat multilayer body 100 including the sensor film 30 held between the first substrate 10 and the second substrate 20 is formed (lamination step). The flat multilayer body 100 illustrated in FIG. 15B includes the decorating film 40 and the intermediate member 50. In the state where the flat multilayer body 100 is formed, the adhesive layers 37, 39, and 45 and the intermediate member 50 between the above components are temporarily cured. The through-hole 20h is filled with the adhesive layer 39 with pressure bonding between the components constituting the flat multilayer body 100.

Figure 16:
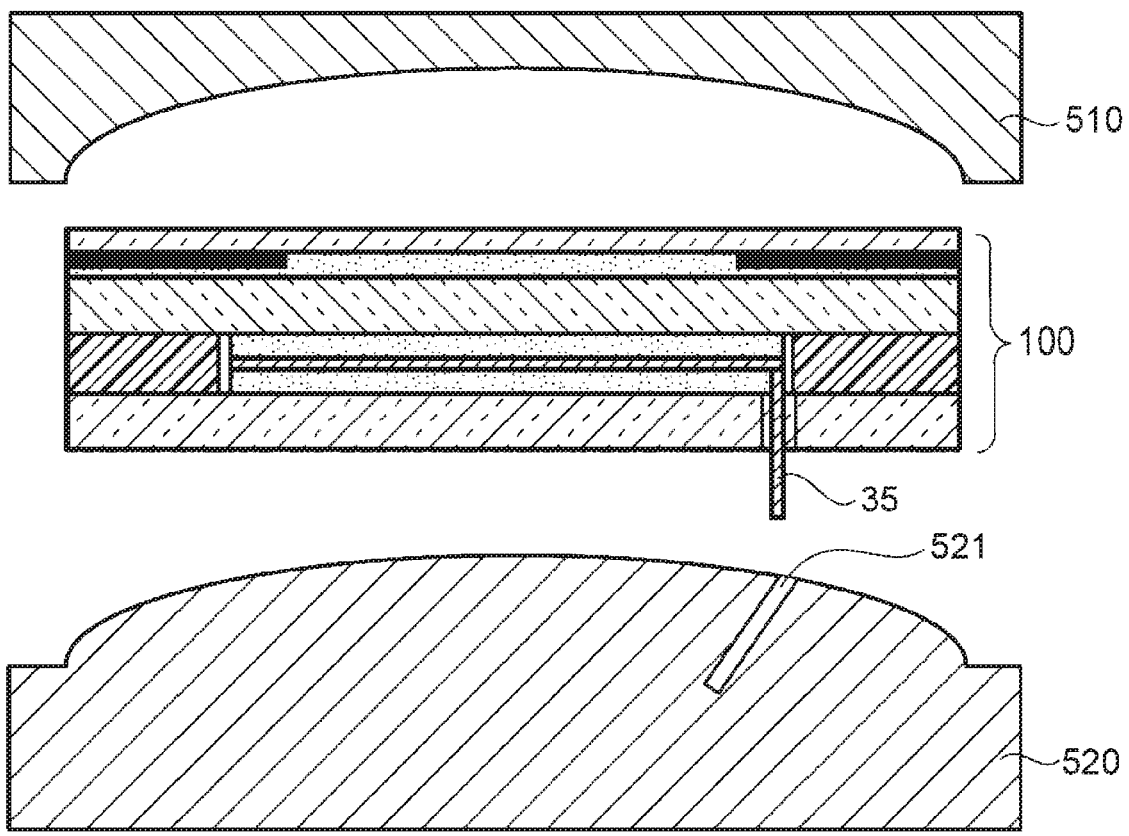
FIG. 16 is a schematic cross-sectional view of an input device manufacturing method (part 5)
Figure 16:
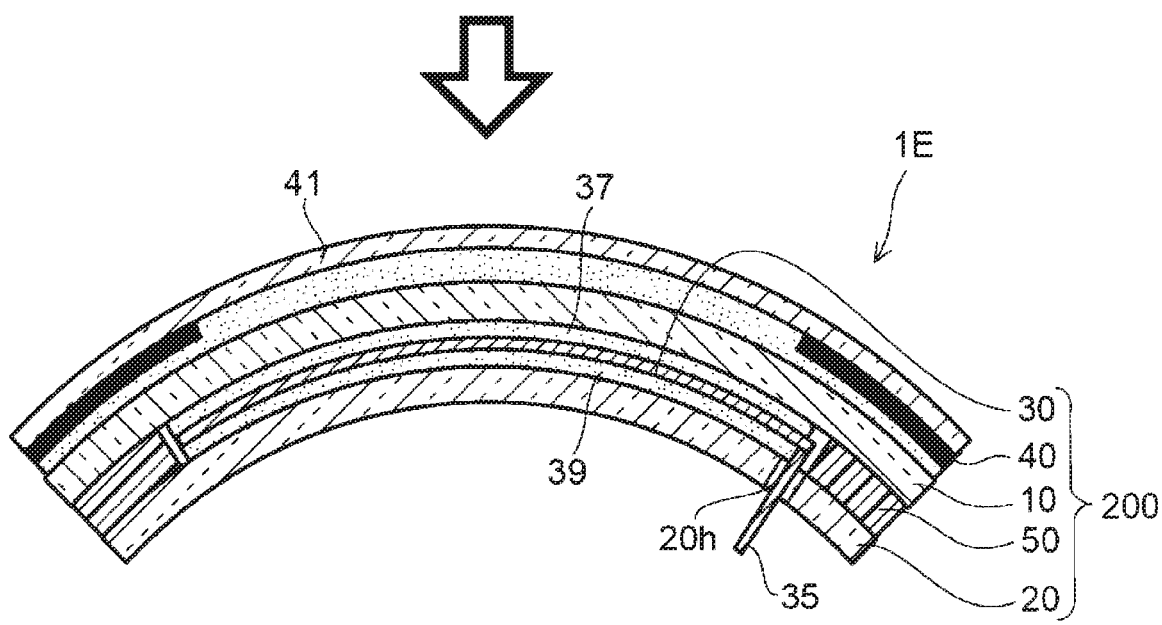

Subsequently, as illustrated in FIG. 16, the upper die 510 and the lower die 520 corresponding to the intended curved shapes are prepared, and the flat multilayer body 100 is placed between the upper die 510 and the lower die 520 to undergo press forming. During this pressing, the lead portion 35 is inserted into the recess 521 in the lower die 520. Thus, the lead portion 35 is prevented from being broken during pressing, so that the curved multilayer body 200 can be formed highly accurately. In the press forming, the flat multilayer body 100 is bent with heat to follow the shapes of the upper die 510 and the lower die 520, and the adhesive layers 37, 39, and 45 and the intermediate member 50 are completely cured at a predetermined temperature. Thus, the flat multilayer body 100 is bent to follow the curved shapes of the upper die 510 and the lower die 520, so that the curved multilayer body 200 retaining the curved shape is formed (bending step). An input device 1E is complete by forming the curved multilayer body 200.

With this manufacturing method, in addition to the effects the same as those in the case of the above manufacturing method (part 1), the first substrate 10 and the second substrate 20 can be firmly bonded together with the adhesive layer 37 and the intermediate member 50, and allow the sensor film 30 even having the curved shape to adhere thereto. The use of a thermosetting adhesive for the intermediate member 50 can effectively prevent distortion of the shape due to springback of the curved multilayer body 200, with which the curved multilayer body 200 is to return to the curved shape.

(Input Device Manufacturing Method: Part 6)

Figure 17A:
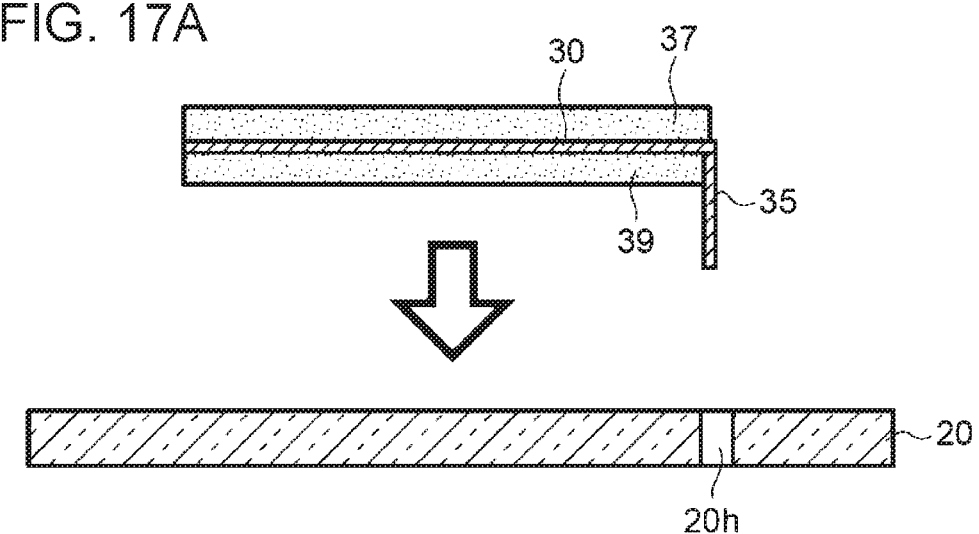
FIGS. 17A to 17C are schematic cross-sectional views of an input device manufacturing method (part 6)
Figure 17B:
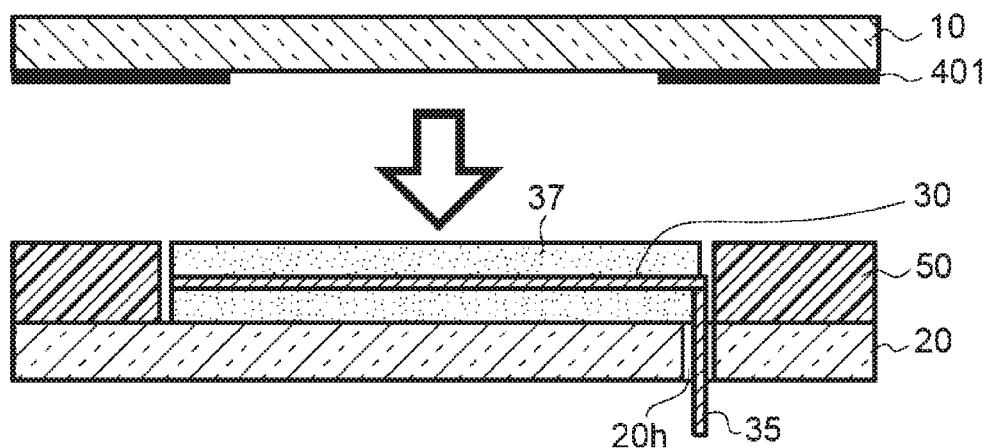
Figure 17C:
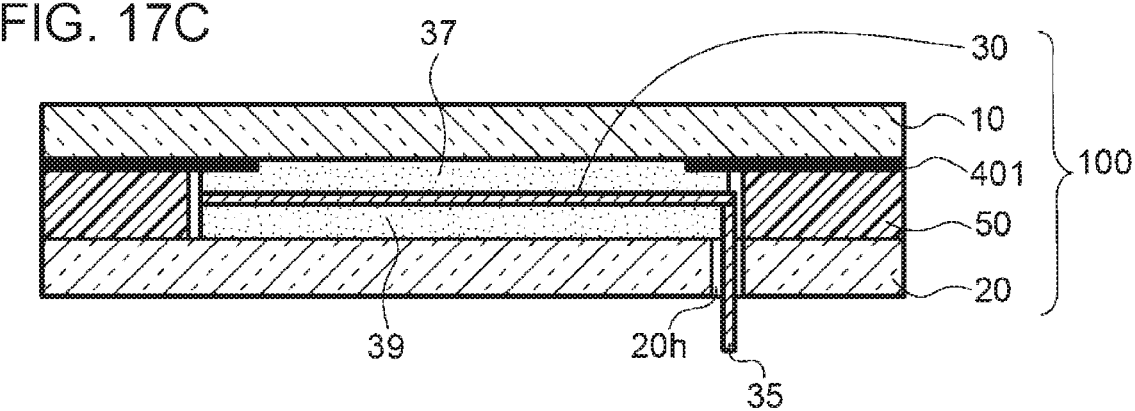
Figure 18:
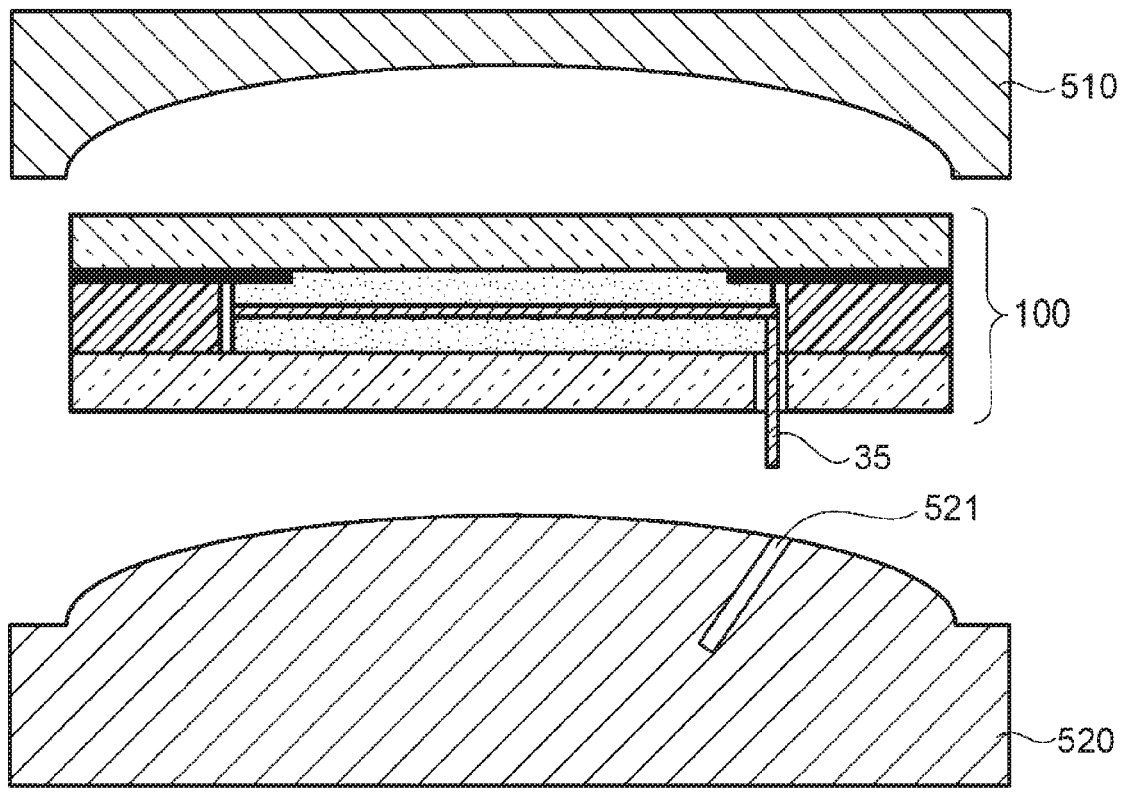
FIG. 18 is a schematic cross-sectional view of an input device manufacturing method (part 6)
Figure 18:
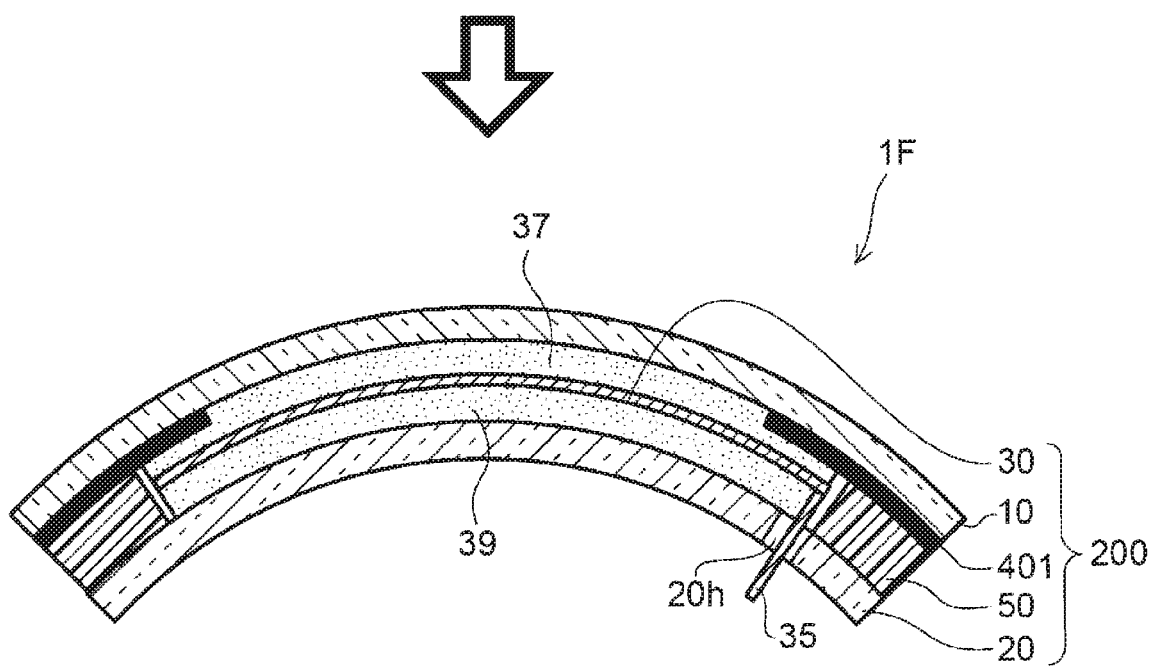

FIG. 17A to FIG. 18 are schematic cross-sectional views of an input device manufacturing method (part 6).

Firstly, as illustrated in FIGS. 17A to 17C, the first substrate 10, the second substrate 20, and the sensor film 30 are prepared. The first substrate 10, the second substrate 20, and the sensor film 30 are made of the same materials and have the same structures as in the case of the above manufacturing method (part 5), except that a decorating portion 401 is disposed on a predetermined position of one surface (back surface) of the first substrate 10.

Subsequently, as illustrated in FIG. 17A, the lead portion 35 on the sensor film 30 is directed to extend to one side. If the lead portion 35 is integrated with the sensor substrate of the sensor film 30, the lead portion 35 is to be folded to one side. If the lead portion 35 and the sensor substrate are separate, the lead portion 35 is to be connected to the sensor substrate to extend to one side.

Subsequently, the lead portion 35 of the sensor film 30 is inserted into the through-hole 20h formed in the second substrate 20. The sensor film 30 is attached to the top surface of the second substrate 20 with the adhesive layer 39 on the back surface. The lead portion 35 is inserted into the through-hole 20h of the second substrate 20 to extend to the opposite side (back surface) of the second substrate 20 opposite to the side facing the sensor film 30.

Subsequently, as illustrated in FIG. 17B, the first substrate 10 and the second substrate 20 to which the sensor film 30 is attached are bonded to each other. The intermediate member 50 is disposed on the outer side of the sensor film 30 on the surface (top surface) of the second substrate 20 facing the first substrate 10. The intermediate member 50 may be made of an OCA or a thermosetting adhesive. An opaque material may be used for the intermediate member 50.

The first substrate 10 is bonded to the second substrate 20 with the intermediate member 50 and the adhesive layer 37 disposed on the top surface of the sensor film 30. Thus, the sensor film 30 and the decorating portion 401 are held between the first substrate 10 and the second substrate 20. In this bonding, the adhesive layer 37 and the intermediate member 50 are interposed over a wide area between the first substrate 10 and the second substrate 20, so that the first substrate 10 and the second substrate 20 can be firmly bonded together.

Thus, as illustrated in FIG. 17C, the flat multilayer body 100 in which the decorating portion 401 and the sensor film 30 are held between the first substrate 10 and the second substrate 20 is formed (lamination step). The flat multilayer body 100 illustrated in FIG. 17C includes the intermediate member 50. In the state where the flat multilayer body 100 is formed, the adhesive layers 37 and 39 and the intermediate member 50 between the above components are temporarily cured. The through-hole 20h is filled with the adhesive layer 39 with pressure bonding between the components constituting the flat multilayer body 100.

Subsequently, as illustrated in FIG. 18, the upper die 510 and the lower die 520 corresponding to the intended curved shapes are prepared, and the flat multilayer body 100 is placed between the upper die 510 and the lower die 520 to undergo press forming. During this pressing, the lead portion 35 is inserted into the recess 521 in the lower die 520. Thus, the lead portion 35 is prevented from being broken during pressing, so that the curved multilayer body 200 can be formed highly accurately. In the press forming, the flat multilayer body 100 is bent with heat to follow the shapes of the upper die 510 and the lower die 520, and the adhesive layers 37 and 39 and the intermediate member 50 are completely cured at a predetermined temperature. Thus, the flat multilayer body 100 is bent to follow the curved shapes of the upper die 510 and the lower die 520, so that the curved multilayer body 200 retaining the curved shape is formed (bending step). An input device IF is complete by forming the curved multilayer body 200.

With this manufacturing method, in addition to the effects the same as those in the case of the above manufacturing method (part 1), the first substrate 10 and the second substrate 20 can be firmly bonded together with the adhesive layer 37 and the intermediate member 50, and allow the sensor film 30 even having the curved shape to adhere thereto. The decorating portion 401 can be disposed at any position as needed. The use of a thermosetting adhesive for the intermediate member 50 can effectively prevent distortion of the shape due to springback of the curved multilayer body 200, with which the curved multilayer body 200 is to return to the curved shape.

(Input Device Manufacturing Method: Part 7)

Figure 19A:
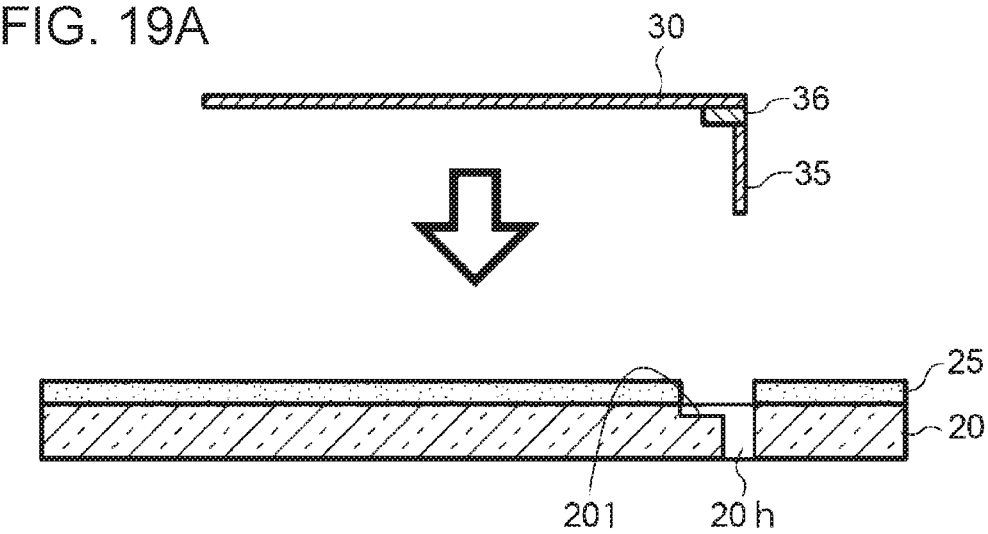
FIGS. 19A to 19C are schematic cross-sectional views of an input device manufacturing method (part 7)
Figure 19B:
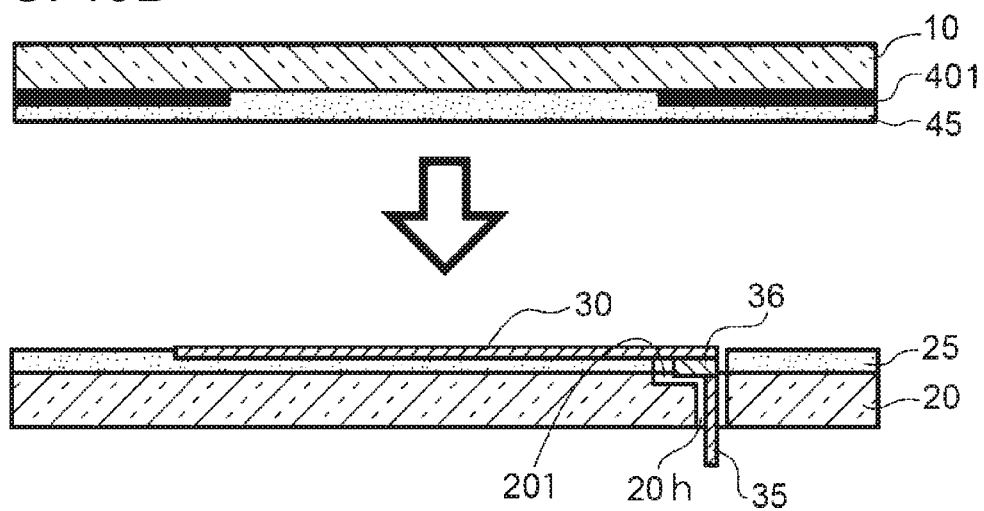
Figure 19C:
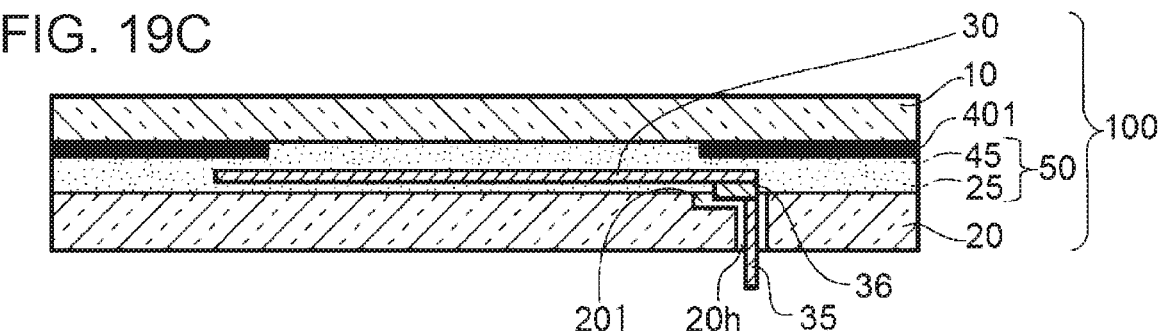
Figure 20:
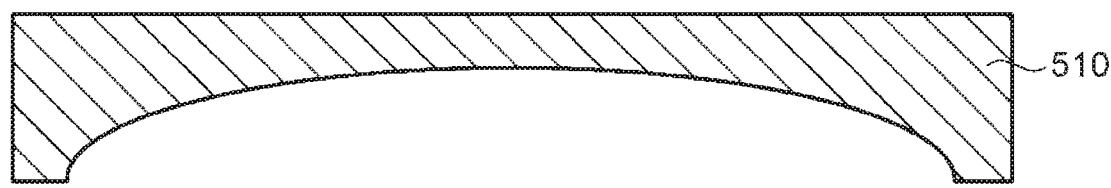
FIG. 20 is a schematic cross-sectional view of an input device manufacturing method (part 7)
Figure 20:
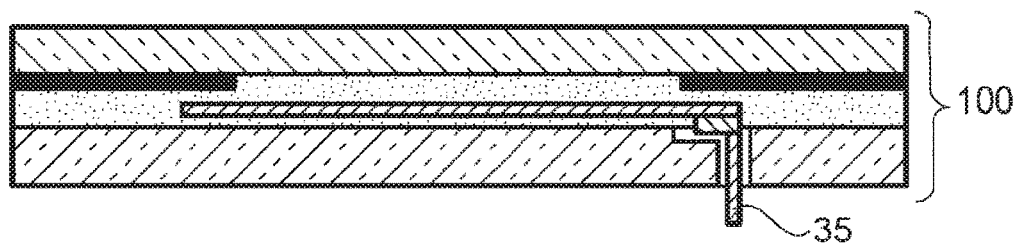
Figure 20:
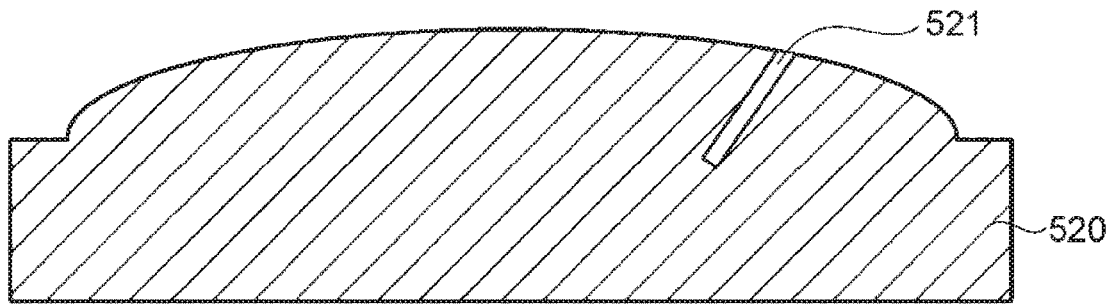
Figure 20:
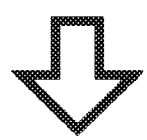
Figure 20:
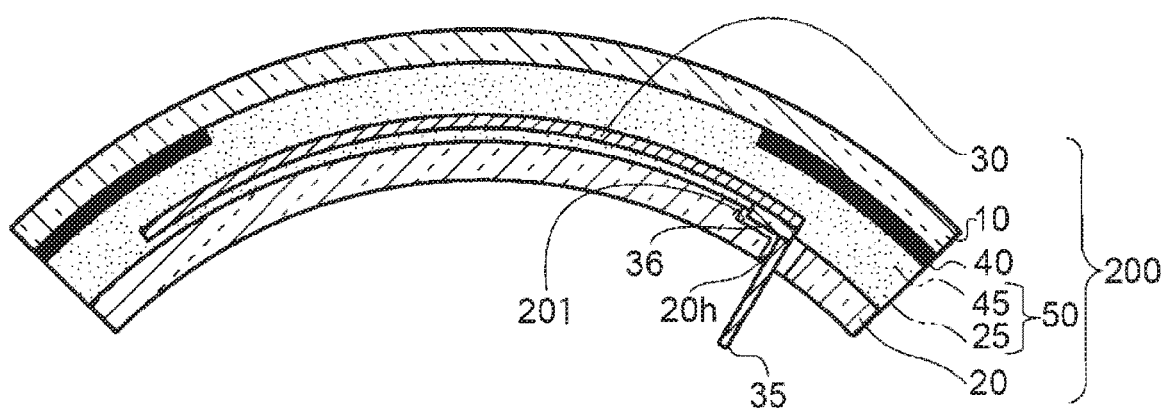

FIG. 19A to FIG. 20 are schematic cross-sectional views of an input device manufacturing method (part 7).

Firstly, as illustrated in FIGS. 19A to 19C, the first substrate 10, the second substrate 20, and the sensor film 30 are prepared. The first substrate 10, the second substrate 20, and the sensor film 30 are made of the same materials and have the same structures as in the case of the above manufacturing method (part 4), except that a recessed portion 201 is formed in one surface (top surface) of the second substrate 20 adjacent to the through-hole 20h. The lead portion 35 of the sensor film 30 is connected to the sensor substrate with a pressure-bonded portion 36.

Subsequently, as illustrated in FIG. 19A, the lead portion 35 of the sensor film 30 is inserted into the through-hole 20h formed in the second substrate 20. Here, the pressure-bonded portion 36 is received in the recessed portion 201. This structure can prevent the thickness of the pressure-bonded portion 36 from affecting the top surface of the sensor film 30.

The adhesive layer (bonding layer) 25 is disposed on the top surface of the second substrate 20. The sensor film 30 is attached to the top surface of the second substrate 20 with the adhesive layer 25. The lead portion 35 is inserted into the through-hole 20h of the second substrate 20 to extend to the opposite side (back surface) of the second substrate 20 opposite to the side facing the sensor film 30.

Subsequently, as illustrated in FIG. 19B, the first substrate 10 on which the decorating portion 401 is disposed and the second substrate 20 to which the sensor film 30 is attached are bonded to each other. The adhesive layer (bonding layer) 45 is disposed on the surface (back surface) of the first substrate 10 on which the decorating portion 401 is disposed. The adhesive layer 45 allows the first substrate 10 and the second substrate 20 to be bonded together.

Thus, as illustrated in FIG. 19C, the flat multilayer body 100 in which the decorating portion 401 and the sensor film 30 are held between the first substrate 10 and the second substrate 20 is formed (lamination step). The flat multilayer body 100 illustrated in FIG. 19C includes the intermediate member 50. The intermediate member 50 is constituted of the adhesive layers 25 and 45 on the outer side of the sensor film 30 between the decorating portion 401 and the second substrate 20. When the first substrate 10 and the second substrate 20 are to be bonded together, the pressure-bonded portion 36, which is received in the recessed portion 201, is held without protruding beyond the top surface of the second substrate 20. Thus, the first substrate 10 and the second substrate 20 can be firmly bonded together with the adhesive layers 25 and 45 without reducing an area over which they are in tightly contact with each other.

In the state where the flat multilayer body 100 is formed, the adhesive layers 25 and 45 between the above components are temporarily cured. The through-hole 20h is filled with the adhesive layers 25 and 45 with pressure bonding between the components constituting the flat multilayer body 100.

Subsequently, as illustrated in FIG. 20, the upper die 510 and the lower die 520 corresponding to the intended curved shapes are prepared, and the flat multilayer body 100 is placed between the upper die 510 and the lower die 520 to undergo press forming. During this pressing, the lead portion 35 is inserted into the recess 521 in the lower die 520. Thus, the lead portion 35 is prevented from being broken during pressing, so that the curved multilayer body 200 can be formed highly accurately. In the press forming, the flat multilayer body 100 is bent with heat to follow the shapes of the upper die 510 and the lower die 520, and the adhesive layers 25 and 45 are completely cured at a predetermined temperature. Thus, the flat multilayer body 100 is bent to follow the curved shapes of the upper die 510 and the lower die 520, so that the curved multilayer body 200 retaining the curved shape is formed (bending step). The input device 1G is complete by forming the curved multilayer body 200.

With this manufacturing method, in addition to the effects the same as those in the case of the above manufacturing method (part 1), the structure in which the lead portion 35 is connected to the sensor substrate with the pressure-bonded portion 36 can achieve sufficiently high adhesive strength.

(Input Device Manufacturing Method: Part 8)

FIG. 21A to FIG. 23 are schematic cross-sectional views of an input device manufacturing method (part 8).

Figure 21A:
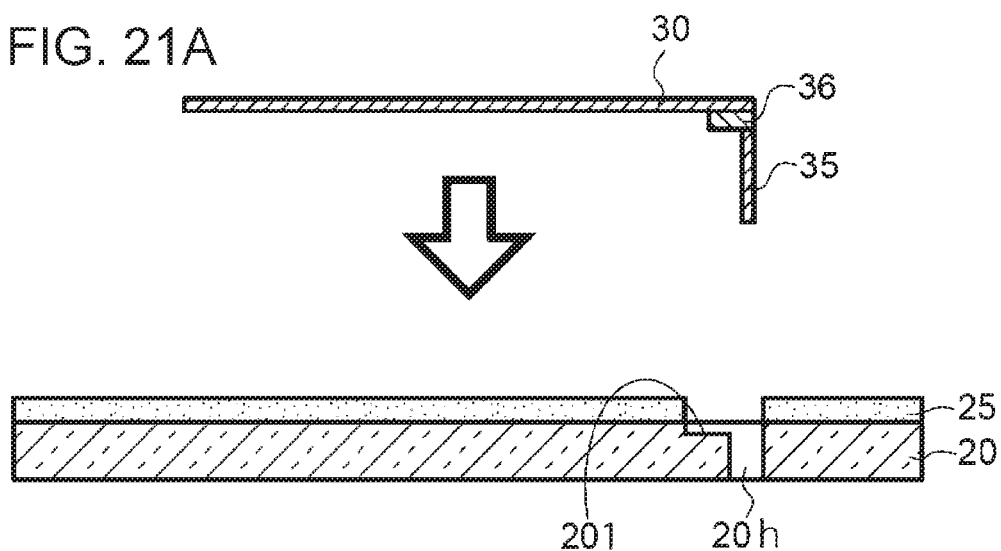
FIGS. 21A to 21C are schematic cross-sectional views of an input device manufacturing method (part 8)
Figure 21B:
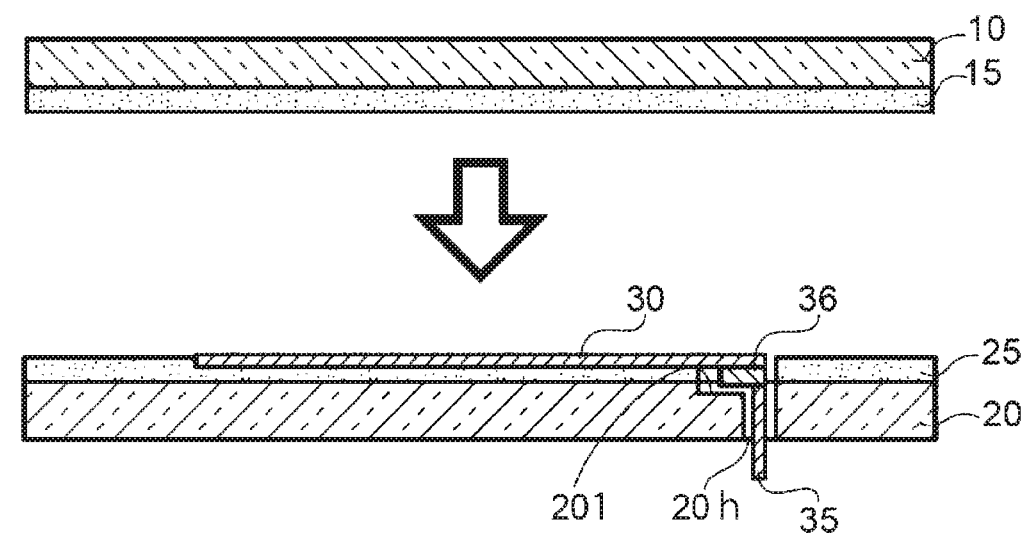
Figure 21C:
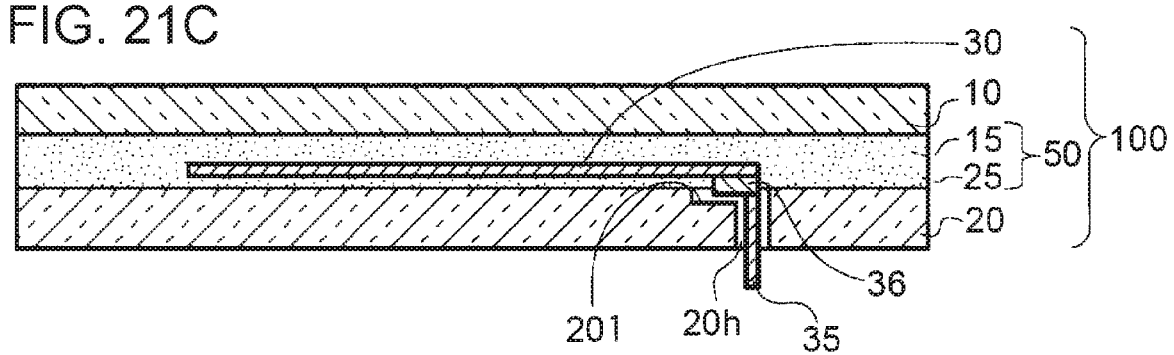

Firstly, as illustrated in FIGS. 21A to 21C, the first substrate 10, the second substrate 20, and the sensor film 30 are prepared. The first substrate 10, the second substrate 20, and the sensor film 30 are made of the same materials and have the same structures as in the case of the above manufacturing method (part 7), except that the decorating portion 401 is not disposed on the first substrate 10.

Subsequently, as illustrated in FIG. 21A, the lead portion 35 of the sensor film 30 is inserted into the through-hole 20h formed in the second substrate 20. Here, the pressure-bonded portion 36 is received in the recessed portion 201. This structure can prevent the thickness of the pressure-bonded portion 36 from affecting the top surface of the sensor film 30.

The adhesive layer (bonding layer) 25 is disposed on the top surface of the second substrate 20. The sensor film 30 is attached to the top surface of the second substrate 20 with the adhesive layer 25. The lead portion 35 is inserted into the through-hole 20h of the second substrate 20 to extend to the opposite side (back surface) of the second substrate 20 opposite to the side facing the sensor film 30.

Subsequently, as illustrated in FIG. 21B, the first substrate 10 is bonded to the top surface of the second substrate 20. The adhesive layer (bonding layer) 15 is disposed on the surface (back surface) of the first substrate 10 facing the second substrate 20. The first substrate 10 is fixed to the top surface of the second substrate 20 with the adhesive layers 15 and 25. Thus, as illustrated in FIG. 21C, the flat multilayer body 100 including the sensor film 30 held between the first substrate 10 and the second substrate 20 is formed (lamination step).

The flat multilayer body 100 illustrated in FIG. 21C includes the intermediate member 50. The intermediate member 50 is constituted of the adhesive layers 15 and 25 on the outer side of the sensor film 30 between the first substrate 10 and the second substrate 20. When the first substrate 10 and the second substrate 20 are to be bonded together, the pressure-bonded portion 36, which is received in the recessed portion 201, is held without protruding beyond the top surface of the second substrate 20. Thus, the first substrate 10 and the second substrate 20 can be firmly bonded together with the adhesive layers 15 and 25 without reducing an area over which they are in tightly contact with each other.

In the state where the flat multilayer body 100 is formed, the adhesive layers 15 and 25 between the above components are temporarily cured. The through-hole 20h is filled with the adhesive layers 15 and 25 with pressure bonding between the components constituting the flat multilayer body 100.

Figure 22:
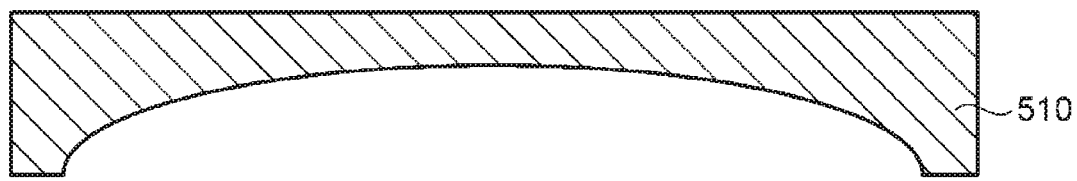
FIG. 22 is a schematic cross-sectional view of an input device manufacturing method (part 8)
Figure 22:
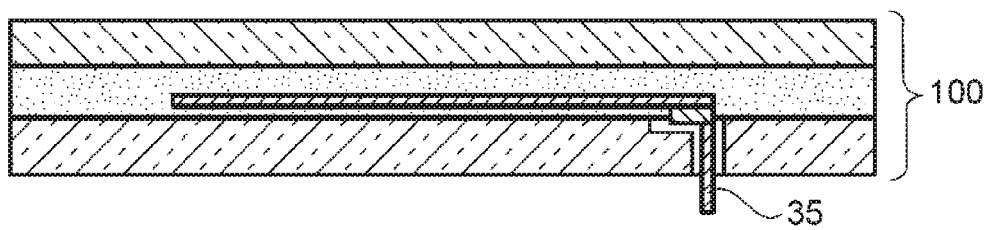
Figure 22:
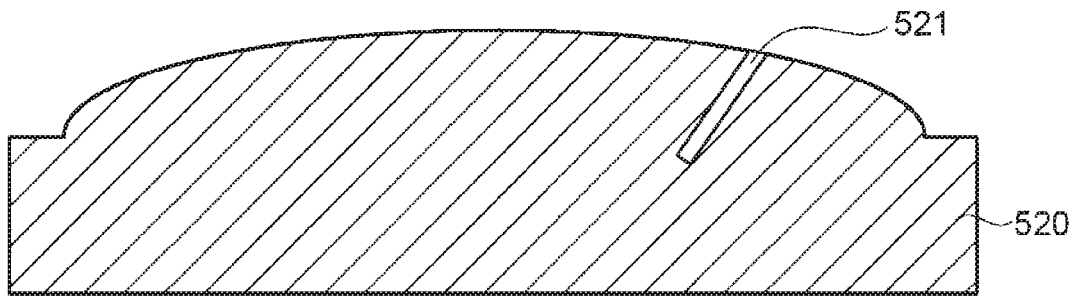
Figure 22:
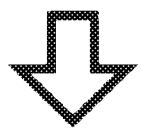
Figure 22:
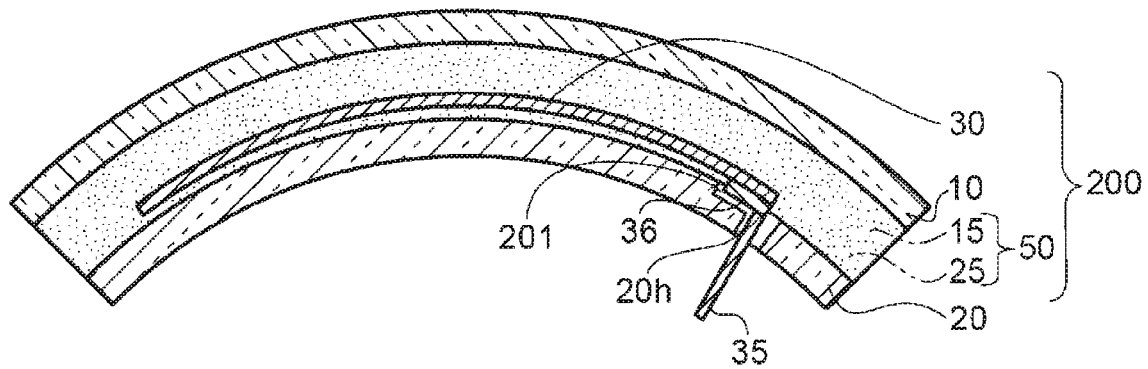

Subsequently, as illustrated in FIG. 22, the upper die 510 and the lower die 520 corresponding to the intended curved shapes are prepared, and the flat multilayer body 100 is placed between the upper die 510 and the lower die 520 to undergo press forming. During this pressing, the lead portion 35 is inserted into the recess 521 in the lower die 520. Thus, the lead portion 35 is prevented from being broken during pressing, so that the curved multilayer body 200 can be formed highly accurately. In the press forming, the flat multilayer body 100 is bent with heat to follow the shapes of the upper die 510 and the lower die 520, and the adhesive layers 15 and 25 are completely cured at a predetermined temperature. Thus, the flat multilayer body 100 is bent to follow the curved shapes of the upper die 510 and the lower die 520, so that the curved multilayer body 200 retaining the curved shape is formed (bending step).

Figure 23:
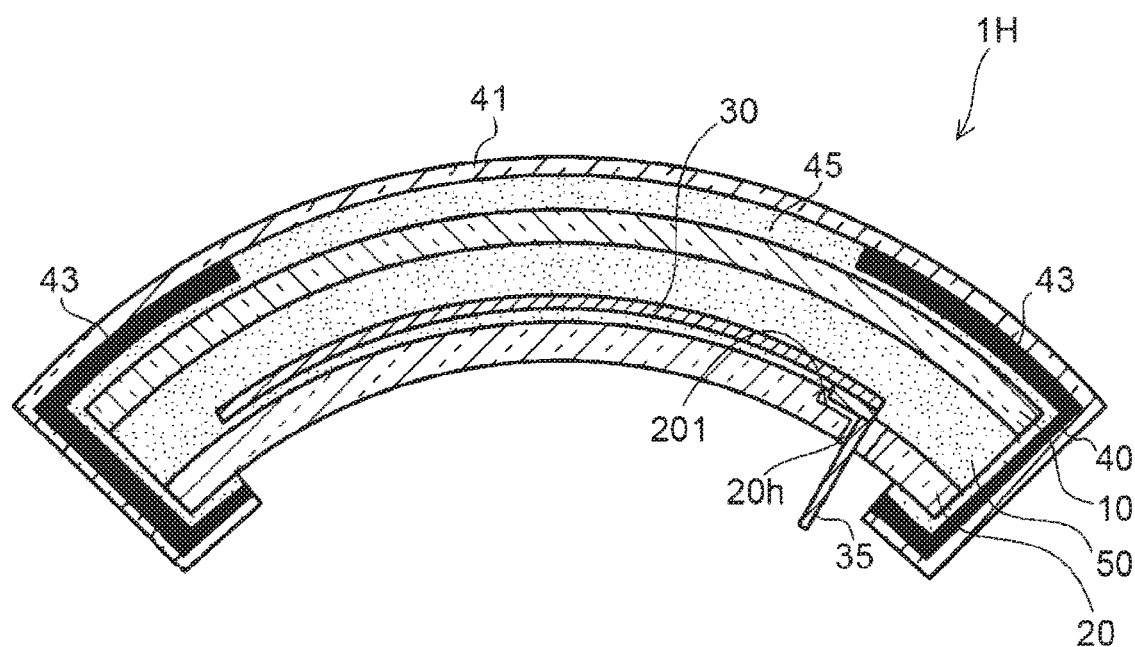
FIG. 23 is a schematic cross-sectional view of an input device manufacturing method (part 8)

Subsequently, as illustrated in FIG. 23, the transparent film 41 on which the decorating film 40 is disposed is attached to the outer side of the curved multilayer body 200 with the adhesive layer (bonding layer) 45 interposed therebetween. The transparent film 41 on which the decorating film 40 is disposed is disposed on the top surface of the curved multilayer body 200 by, for example, TOM forming to tightly adhere to the surface (bonding step). Thus, an input device 1H is complete.

With this manufacturing method, in addition to the effects the same as those in the case of the above manufacturing method (part 7), the side end surface of the curved multilayer body 200 can be covered with the decorating layer 43 of the decorating film 40, specifically, the end portion of the decorating film 40, and, thus, stray light that is to enter the inside from the side end surface of the curved multilayer body 200 can be effectively blocked.

(Peel Strength Test)

The inventor of the present application prepared a sample by bonding the sensor film 30 and the substrate to the adhesive layer (bonding layer), and conducted a test to find the peel strength of the sensor film 30. Samples include a "single-side bonded sample", and a "double-side bonded sample". The "single-side bonded sample" is formed by bonding the sensor film 30 to one surface of a resin panel, corresponding to a substrate, with an OCA. The "double-side bonded sample" is formed by bonding resin panels, corresponding to substrates, to the top and back surfaces of the sensor film 30 with an OCA.

In the peel strength test, both samples were formed into a curved shape (spherical surface with the radius of a sphere SR of 200 mm), and then an environmental test (temperature: 85° C., humidity: 85% RH) was conducted to determine whether the sensor film 30 and the substrate (resin panel) are separated from each other.

In the above test, six samples were formed for each type of samples. In relation to the time elapsed in the environmental test, the number of samples that were found to have caused separation was determined. Table 1 shows the test results.

TABLE 1

|  | Initial Stage | 24 hrs | 50 hrs | 100 hrs | 1000 hrs |
|---|---|---|---|---|---|
| Both-side bonded sample | 0/6 | 0/6 | 0/6 | 0/6 | 0/6 |
| Single-side bonded sample | 0/6 | 2/6 | 6/6 | 6/6 | 6/6 |

The above test results have revealed that all the six "single-side bonded samples" have caused separation with the elapse of 50 hours or more. On the other hand, none of the "double-side bonded samples" have caused separation even with the elapse of 1000 hours. Thus, the "double-side bonded samples" are regarded as being stable without causing separation under the conditions of the above environmental test.

As described above, the present embodiment can provide a method for manufacturing each of the input devices 1A to 1H having a curved shape that can secure sufficient adhesion between the first substrate 10, and the second substrate 20, and the sensor film 30, and that can obtain high detection accuracy with the sensor film 30.

(Structure of Input Device: Part 2)

Figure 24:
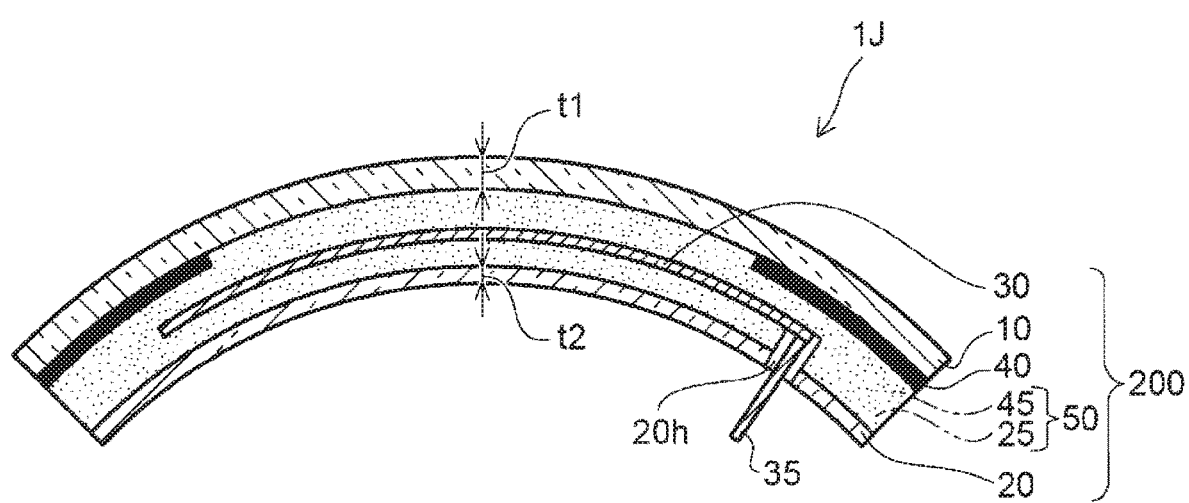
FIG. 24 is a schematic cross-sectional view of an input device (part 2) according to the present embodiment.

FIG. 24 is a schematic cross-sectional view of an input device (part 2) according to the present embodiment. As illustrated in FIG. 24, in an input device 1J, a thickness t2 of the second substrate 20 is smaller than a thickness t1 of the first substrate 10.

The method for manufacturing the input device 1J is the same as that for the input device 1A. Specifically, the method includes a lamination step of preparing the flat first substrate 10, the flat second substrate 20, and the sensor film 30, and holding the sensor film 30 between the first substrate 10 and the second substrate 20 to form the flat multilayer body 100; and a bending step of bending the flat multilayer body 100 to form the curved multilayer body 200 that retains a curved shape.

In this bending step, the flat multilayer body 100 is bent so that the first substrate 10 disposed on the top surface of the sensor film 30 is bent into a convex shape, and so that the second substrate 20 disposed on the back surface of the sensor film 30 is bent into a concave shape to form the curved multilayer body 200. Specifically, the curved multilayer body 200 is bent to have the detection area side (top surface) of the sensor film 30 to curve outward into a convex, and the side (back surface) opposite to the detection area side to curve inward into a concave. Thus, the first substrate 10 is located on the outer circumference of the curve, and the second substrate 20 is located on the inner circumference of the curve.

In the bending step, the flat multilayer body 100 is bent so that the first substrate 10 curves outward into a convex and the second substrate 20 curves inward into a concave. Thus, the member located closer to the first substrate 10 of the flat multilayer body 100 is more likely to receive a greater tensile stress than the member located closer to the second substrate 20. Thus, the sensor film 30 disposed between the first substrate 10 and the second substrate 20 is less likely to receive a tensile stress during the bending step when located closer to the second substrate 20 than located closer to the first substrate 10.

A greater tensile stress received during the bending step is more likely to cause defects such as an increase in resistance due to cracks or breakage in the pattern of the electrode layer disposed on the sensor film 30. Particularly, use of an inorganic electroconductive material, such as an indium tin oxide (ITO), as the electrode layer of the sensor film 30 will more likely to cause breakage or cracks due to the stress because the inorganic electroconductive material has low elasticity.

In the input device 1J according to the present embodiment, the thickness t2 of the second substrate 20 is smaller than the thickness t1 of the first substrate 10 to allow the sensor film 30 to be located relatively closer to the second substrate 20 (inner peripheral side). In this structure, the entire shape of the curved multilayer body 200 is mainly retained by the first substrate 10, and the second substrate 20 is used as a protection member that prevents the die set from directly pressing the sensor film 30 in the bending step.

In the curved multilayer body 200 of the input device 1J according to the present embodiment, the ratio of the thickness t2 of the second substrate 20 to the thickness t1 of the first substrate 10 is preferably smaller than 0.5, or more preferably, smaller than or equal to 0.25. By thus defining the relationship between the thickness t1 of the first substrate 10 and the thickness t2 of the second substrate 20, the responsivity of the sensor film 30 can be secured, the shape of the curved multilayer body 200 can be retained, and the stress applied to the sensor film 30 through bending can be reduced.

The lower limit of the thickness t2 of the second substrate 20 is determined so that the sensor film 30 is appropriately protected by the second substrate 20 in the bending step of forming the curved multilayer body 200 from the flat multilayer body 100. The thickness t1 of the first substrate 10 is determined from the strength securing viewpoint for retaining the curved shape of the curved multilayer body 200 and from the viewpoint for securing the responsivity of the sensor film 30.

When, for example, an acrylic resin such as a PMMA resin, or a PC resin is used as the first substrate 10, the thickness t1 is greater than or equal to approximately 0.3 mm and smaller than or equal to approximately 5 mm, preferably, greater than or equal to approximately 0.5 mm and smaller than or equal to approximately 3 mm, or more preferably, greater than or equal to approximately 1 mm and smaller than or equal to approximately 2.0 mm. When, for example, an acrylic resin such as a PMMA resin, or a PC resin is used as the second substrate 20, the thickness t2 is smaller than the thickness t1, and is greater than or equal to approximately 0.25 mm and smaller than or equal to approximately 2 mm, preferably, approximately smaller than or equal to 0.3 mm, or more preferably, greater than or equal to approximately 0.5 mm and smaller than or equal to approximately 1.5 mm.

By thus determining the thickness t2 of the second substrate 20 to be smaller than the thickness t1 of the first substrate 10, possible electroconductive defects such as breakage of the pattern of the electrode layer or an increase in resistance can be reduced when the sensor film 30 is bent.

(Continuity Test)

A test for the curved multilayer body 200 was conducted to find the electroconductive characteristics of the sensor film 30 while changing the thickness t2 of the second substrate 20.

In a first sample, the thickness t1 of the first substrate 10 was 2 mm, and the thickness t2 of the second substrate 20 was 0.5 mm. Specifically, the ratio of the thickness t2 to the thickness t1 was 0.25. In a second sample, the thickness t1 of the first substrate 10 was 2 mm, and the thickness t2 of the second substrate 20 was 1 mm. Specifically, the ratio of the thickness t2 to the thickness t1 was 0.5.

In both types of sample, the sensor film 30 was held between the first substrate 10 and the second substrate 20, bonded thereto with an OCA with a thickness of 0.175 mm, and curved into a 3D curved surface (spherical surface or simulated convex surface) with the radius of a sphere SR of 400 mm. The electrode layer of the sensor film 30 was formed from ITO.

In each type of these samples, the resistance of each of multiple electrodes arranged in an array in the plane of the sensor film 30 was measured. Table 2 and Table 3 show the test results. Table 2 shows the test results for the first sample, and Table 3 shows the test results for the second sample.

The numerical values in the tables in the X-axis direction and the Y-axis direction denote the positions of the electrodes located in each axis direction while the position of the electrode located at the center (drawing tip) during forming is regarded as 0.

The electroconductive characteristics (resistance) of the electrodes are represented with A, B, C, D and E. A denotes smaller than 1 kΩ, B denotes equal to or greater than 1 kΩ and smaller than 2 kΩ, C denotes equal to or greater than 2 kΩ and smaller than 3 kΩ, D denotes equal to or greater than 3 kΩ, and E denotes breakage.

TABLE 2

| | | X-axis direction | | | | | | | | | | | |
|---|---|---|---|---|---|---|---|---|---|---|---|---|---|
| | | −6 | −5 | −4 | −3 | −2 | −1 | 0 | 1 | 2 | 3 | 4 | 5 | 6 |
| Y-axis direction | 7 | A | A | A | A | A | A | A | A | A | A | A | A | A |
| | 6 | A | A | A | A | A | A | A | A | A | A | A | A | A |
| | 5 | A | A | A | A | A | A | A | A | A | A | A | A | A |
| | 4 | A | A | A | A | A | A | A | A | A | A | A | A | A |
| | 3 | A | A | A | A | A | A | A | A | A | A | A | A | A |
| | 2 | A | A | A | A | A | A | A | A | A | A | A | A | A |

TABLE 2-continued

| | | -6 | -5 | -4 | -3 | -2 | -1 | 0 | 1 | 2 | 3 | 4 | 5 | 6 |
|---|---|---|---|---|---|---|---|---|---|---|---|---|---|---|
| | | | | | | X-axis direction | | | | | | | | |
| | 1 | A | A | A | A | A | A | A | A | A | A | A | A | A |
| | 0 | A | A | A | A | A | A | A | A | A | A | A | A | A |
| | -1 | A | A | A | A | A | A | A | A | A | A | A | A | A |
| | -2 | A | A | A | A | A | A | A | A | A | A | A | A | A |
| | -3 | A | A | A | A | A | A | A | A | A | A | A | A | A |
| | -4 | A | A | A | A | A | A | A | A | A | A | A | A | A |
| | -5 | A | A | A | A | A | A | A | A | A | A | A | A | A |
| | -6 | A | A | A | A | A | A | A | A | A | A | A | A | A |
| | -7 | A | A | A | A | A | A | A | A | A | A | A | A | A |

TABLE 3

| | | -6 | -5 | -4 | -3 | -2 | -1 | 0 | 1 | 2 | 3 | 4 | 5 | 6 |
|---|---|---|---|---|---|---|---|---|---|---|---|---|---|---|
| | | | | | | X-axis direction | | | | | | | | |
| Y-axis direction | 7 | E | E | D | E | E | E | C | B | B | A | B | B | D |
| | 6 | E | E | E | C | E | E | D | B | B | B | B | B | C |
| | 5 | E | E | E | E | E | C | E | C | C | C | C | B | C |
| | 4 | E | E | E | E | E | B | E | C | C | C | B | B | C |
| | 3 | E | E | E | E | C | C | C | B | B | B | B | C | B |
| | 2 | E | E | E | C | B | C | C | C | B | B | C | B | B |
| | 1 | E | E | C | B | B | D | E | E | B | B | B | D | E |
| | 0 | E | E | C | D | C | C | C | E | C | B | B | E | B |
| | -1 | E | E | C | E | C | C | B | B | B | C | B | E | C |
| | -2 | E | E | C | E | D | D | E | E | C | B | B | E | E |
| | -3 | E | B | C | B | C | E | E | B | C | C | E | E | E |
| | -4 | E | C | C | C | E | C | E | B | B | C | E | E | E |
| | -5 | B | C | C | C | C | C | B | B | E | C | C | E | E |
| | -6 | B | C | C | C | E | D | B | B | C | D | E | E | E |
| | -7 | C | C | B | B | C | C | B | B | B | C | C | B | E |

The test results reveal that the first sample has preferable electroconductive characteristics than the second sample. Specifically, the obtained test results reveal that the structure where the ratio of the thickness t2 of the second substrate 20 to the thickness t1 of the first substrate 10 is 0.25 has lower resistance and is more stable than the structure where the ratio is 0.5.

However, in the structure where the thickness t2 of the second substrate 20 is excessively reduced, the separation prevention effect of the sensor film 30 may be insufficient. Thus, the thickness t2 of the second substrate 20 is preferably greater than or equal to 0.25 mm, more preferably, greater than or equal to 0.3 mm, or more preferably, approximately 0.5 mm.

(Structure of Input Device: Part 3)

Figure 25:
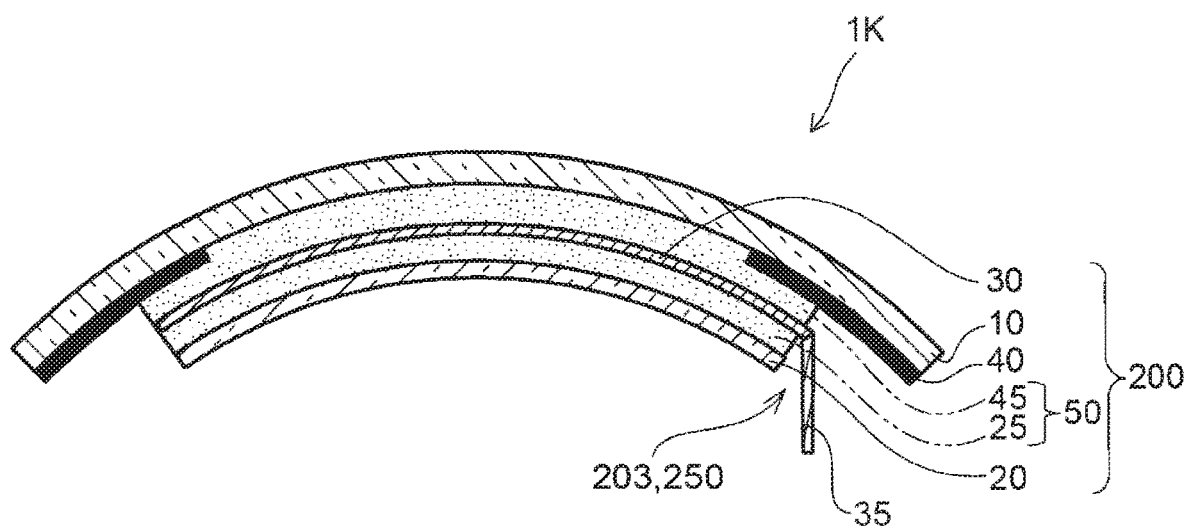
FIG. 25 is a schematic cross-sectional view of an input device (part 3) according to the present embodiment.

FIG. 25 is a schematic cross-sectional view of an input device (part 3) according to the present embodiment. As illustrated in FIG. 25, in an input device 1K, the lead portion 35 extends to the back surface (the surface of the second substrate 20 opposite to the surface facing the sensor film 30) from a cut portion 203 formed in the second substrate 20.

Here, the cut portion 203 is an example of the non-lamination area 250 in which the second substrate 20 is absent when viewed in the lamination direction of the curved multilayer body 200. The cut portion 203 is an area where the second substrate 20 is partially set back inward from the outer edge. The end portion of the first substrate 10 and the end portion of the decorating portion 401 extend into the cut portion 203. The lead portion 35 is bent from the cut portion 203 toward the back surface.

The lead portion 35 thus wired to the back surface from the cut portion 203 is prevented from being seen from the top surface. The lead portion 35 that extends without being folded along the end surface of the input device 1K is prevented from causing defects such as breakage due to being folded.

(Structure of Input Device: Part 4)

Figure 26A:
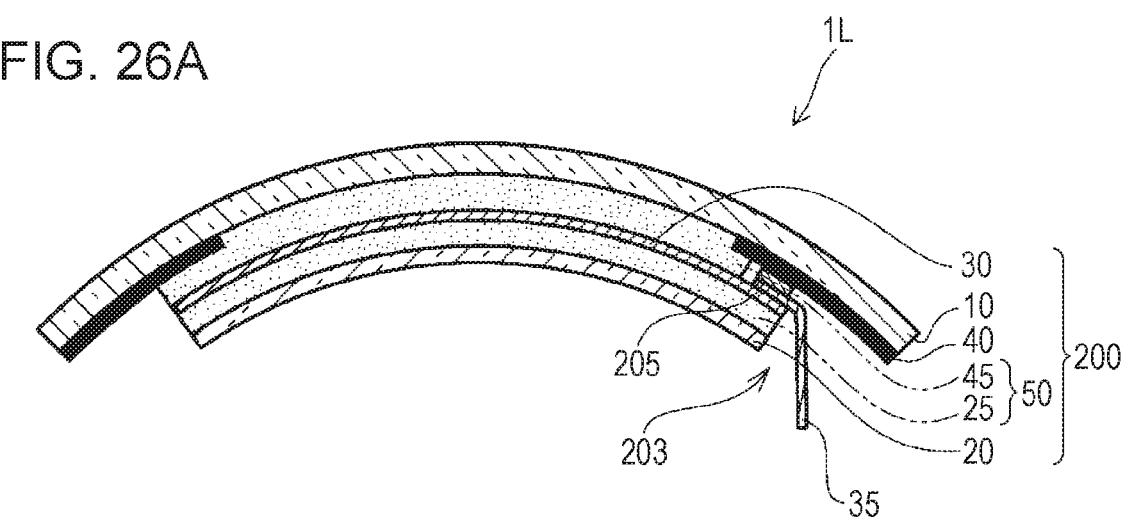
FIGS. 26A to 26C are schematic cross-sectional views of an input device (part 4) according to the present embodiment.
Figure 26B:
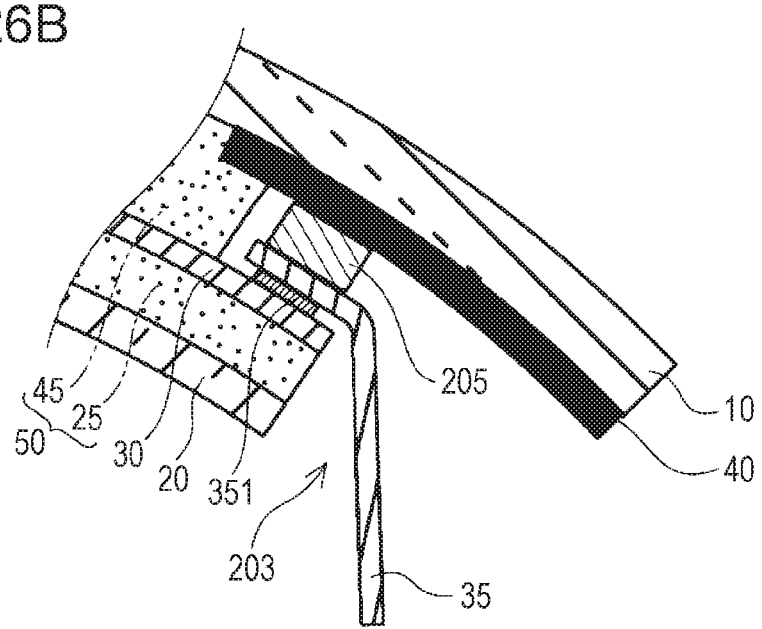
Figure 26C:
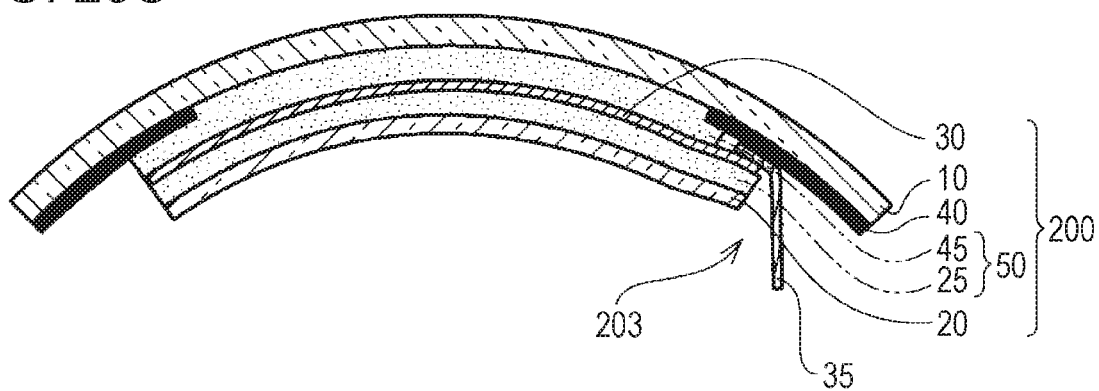
Figure 27:
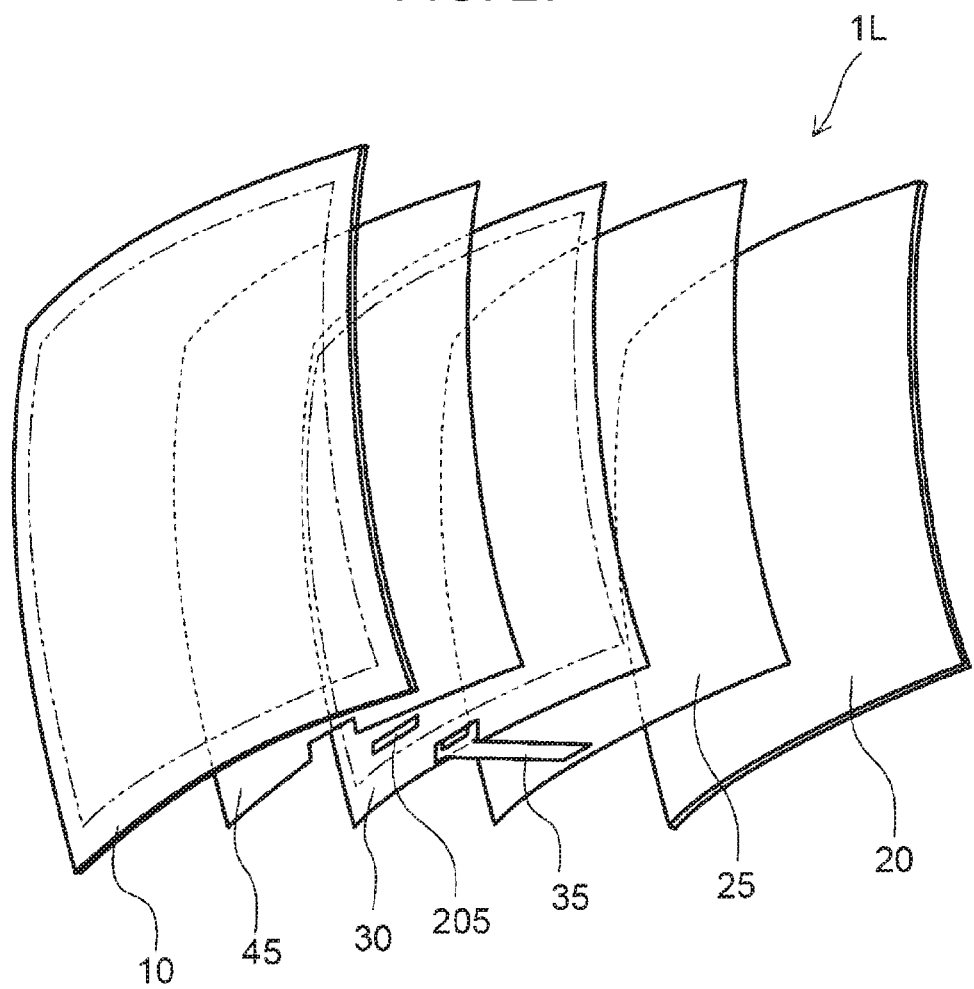
FIG. 27 is an exploded perspective view of an input device (part 4)
Figure 28:
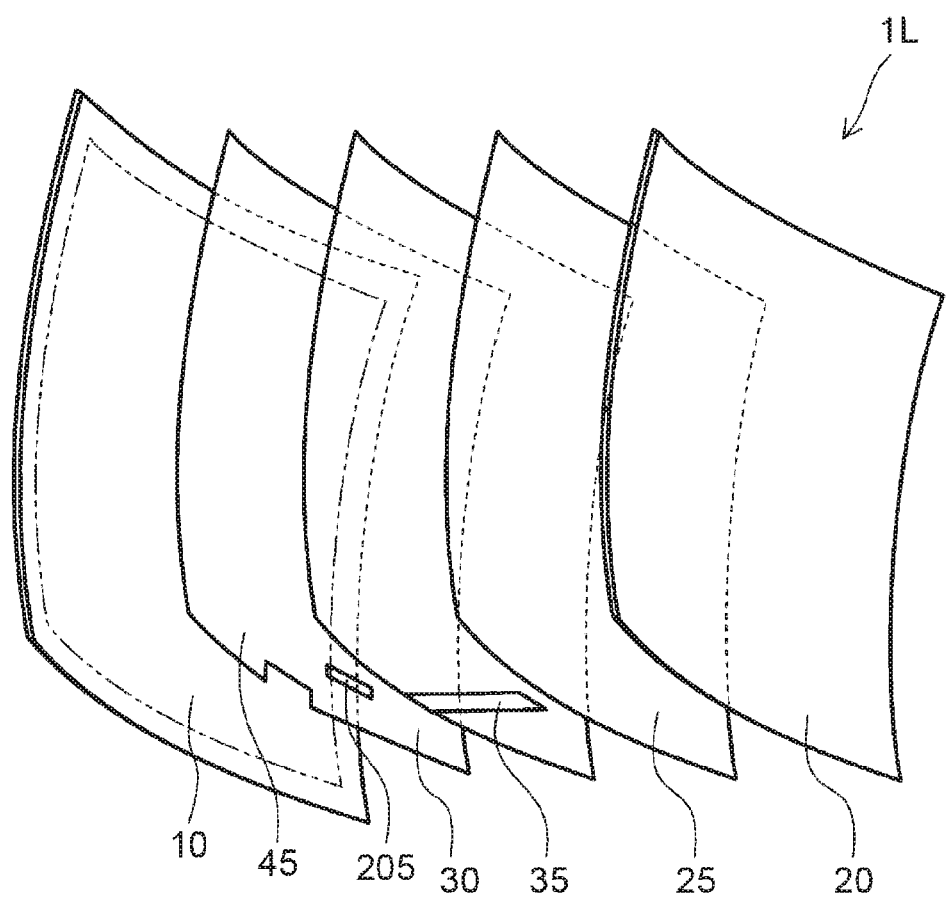
FIG. 28 is an exploded perspective view of an input device (part 4).

FIGS. 26A to 26C are schematic cross-sectional views of an input device (part 4) according to the present embodiment. FIG. 26A illustrates the entirety of the input device, FIG. 26B is an enlarged view of a connection portion of the lead portion 35, and FIG. 26C illustrates the entirety of an input device not including a spacer 205. FIG. 27 and FIG. 28 are exploded perspective views of the input device (part 4). FIG. 27 is an exploded perspective view of the input device viewed from the top surface, and FIG. 28 is an exploded perspective view of the input device viewed from the back surface.

As illustrated in FIGS. 26A and 26B, an input device 1L includes a spacer 205 at an end portion of the second substrate 20 facing the cut portion 203. The spacer 205 can prevent a connection portion of the lead portion 35 to be connected to the sensor film 30 from being bent (deformed) toward the first substrate 10 along the end portion of the second substrate 20 when the first substrate 10, the second substrate 20, and the sensor film 30 are laminated and bonded together or when the flat multilayer body 100 is formed into the curved multilayer body 200 in the die set.

As illustrated in FIG. 26B, a pad electrode 351 used to connect the lead portion 35, which is a flexible circuit, is disposed at the end portion of the sensor film 30. To connect the pad electrode 351 to the lead portion 35, the intermediate member 50 is not disposed at the end portion of the sensor film 30 at which the pad electrode 351 is disposed (refer to FIG. 27 and FIG. 28). The spacer 205 is disposed in an area where the intermediate member 50 is not disposed.

As illustrated in FIG. 26C, in the structure not including the spacer 205 in this area, the end portion of the second substrate 20 and the connection portion of the lead portion 35 are more likely to be deformed toward the first substrate 10 along the end portion of the second substrate 20 when the first substrate 10, the second substrate 20, and the sensor film 30 are laminated and bonded together or when the flat multilayer body 100 is bent. The spacer 205 serves as a support, and prevents deformation of the second substrate 20 and the lead portion 35.

The embodiments have been described thus far, but the present invention is not limited to these examples. For example, each of the above-described embodiments to or from which any component is added or deleted as appropriate or whose design is changed as appropriate by persons having ordinary skill in the art, and an appropriate combination of the features of any two or more of the embodiments are also included in the scope of the present invention as long as they are within the scope of the present invention.

For example, the through-hole 20h may have any specific shape as long as it allows the lead portion 35 to extend therethrough as appropriate. When viewed from the main surface of the second substrate, the through-hole 20h may have a closed shape with its opening crossing none of the sides of the second substrate, or may have a slit shape with its opening crossing at least one of the sides of the second substrate.

In some cases, the sensor film 30 and the lead portion 35 are formed from separate components, and they may overlap each other to form a locally thick portion. To address such a case, the portion of the second substrate 20 facing this portion may be thinned in advance to enhance, in the manufacturing procedure, the flatness of the surface of the sensor film 30 facing the first substrate 10 located on the second substrate 20. Thus, the surface of the obtained curved multilayer body 200 facing the first substrate 10 is stably prevented from having a defect of local swelling (local degradation in flatness).

What is claimed is:

1. A method for manufacturing an input device, comprising:
    preparing a first substrate in a form of a flat plate made of a translucent synthetic resin;
    preparing a second substrate in a form of a flat plate made of a translucent synthetic resin;
    preparing a sensor film in a form of a translucent resin film on which a translucent electrode is disposed, the sensor film including a lead portion having a lead wire electrically connected to the translucent electrode;
    disposing the sensor film between a bottom surface of the first substrate and a top surface of the second substrate to form a flat laminated body in a form of a flat plate; and
    bending the flat laminated body into a curved laminated body which retains a curved shape thereof,
    wherein the curved laminated body includes a non-lamination portion lacking the second substrate, such that the second substrate has a cutout area viewed in a lamination direction, the disposing including:
    inserting and extending the lead portion of the sensor film through the cutout area of the second substrate to a bottom surface of the second substrate which is opposite to the top surface of the second substrate.

2. The method according to claim 1, wherein the bending includes heating the flat laminated body while being bent.

3. The method according to claim 1, wherein the bending includes bending the flat laminated body at a first temperature into the curved shape, and heating the bent laminated body at a second temperature so as to retain the curved shape.

4. The method according to claim 1, wherein the disposing provides the first substrate having a first thickness on a top surface of the sensor film, and provides the second substrate having a second thickness smaller than the first thickness on a bottom surface of the sensor film,
and wherein the bending provides the curved laminated body with a convex front surface which is a top surface of the first substrate, and with a concave back surface which is a bottom surface of the second substrate.

5. The method according to claim 4, wherein a ratio of the second thickness to the first thickness is smaller than 0.5.

6. The method according to claim 4, wherein a ratio of the second thickness to the first thickness is smaller than or equal to 0.25.

7. The method according to claim 1, wherein the disposing includes providing a decorating film on a surface of the first substrate opposite to a surface facing the sensor film to form the flat laminated body.

8. The method according to claim 1, wherein the disposing includes providing a decorating film between the first substrate and the sensor film to form the flat laminated body.

9. The method according to claim 1, further comprising:
    bonding, after the bending, a decorating film on a top surface of the curved laminated body.

10. The method according to claim 9, wherein the bonding includes covering a side end surface of the curved laminated body with an end portion of the decorating film.

11. The method according to claim 1, further comprising:
    providing a decorating portion disposed on a top surface of the first substrate.

12. The method according to claim 1, wherein the disposing includes:
    providing an intermediate member between the sensor film and the first substrate, and between the sensor film and the second substrate to form the flat laminated body.

13. The method according to claim 12, wherein the intermediate member includes an optically clear adhesive (OCA).

14. The method according to claim 12, wherein the intermediate member includes a thermosetting adhesive.

15. An input device, comprising:
    a curved laminated body having a curved detection area, the curved laminated body including:
        a first substrate which is a first resin panel made of a translucent synthetic resin and having a curved shape;
        a second substrate which is a second resin panel made of a translucent synthetic resin and having a curved shape; and
        a sensor film disposed between a bottom surface of the first substrate and a top surface of the second substrate, the sensor film being in a form of a translucent resin film on which a translucent electrode is disposed, the sensor film including a lead portion having a lead wire electrically connected to the translucent electrode,
    wherein the curved laminated body includes a non-lamination portion at which the curved lamination body lacks the second substrate so as to provide a cutout area in the second substrate viewed in a lamination direction, and wherein the lead portion extends from the sensor film through the cutout area of the second substrate to a bottom surface of the second substrate which is opposite to the top surface of the second substrate.

16. The input device according to claim 15, wherein the curved laminated body has a shape of one of a semi-circular cylinder, a hemisphere, and a three-dimensional shape.

17. The input device according to claim 15, further comprising:
an intermediate member disposed between the sensor film and the first substrate, and between the sensor film and the second substrate.

18. The input device according to claim 17, wherein the intermediate member includes a cured thermosetting material.

19. The input device according to claim 15,
wherein the curved laminated body has a convex front surface and a concave back surface, the convex front surface being a top surface of the first substrate disposed on a top surface of the sensor film, and the concave back surface being the bottom surface of the second substrate disposed on a bottom surface of the sensor film, and
wherein the second substrate has a thickness smaller than a thickness of the first substrate.

20. The input device according to claim 19, wherein a ratio of the thickness of the second substrate to the thickness of the first substrate is smaller than 0.5.

21. The input device according to claim 19, wherein a ratio of the thickness of the second substrate to the thickness of the first substrate is smaller than or equal to 0.25.

22. The input device according to claim 15, wherein the lead portion extends beyond the bottom surface of the second substrate.

* * * * *